US011536250B1

(12) United States Patent
Landa et al.

(10) Patent No.: US 11,536,250 B1
(45) Date of Patent: Dec. 27, 2022

(54) SYSTEM AND METHOD FOR CONTROLLING A WIND TURBINE

(71) Applicant: General Electric Company, Schenectady, NY (US)

(72) Inventors: Bernard P. Landa, Clifton Park, NY (US); Pierino Gianni Bonanni, Loudonville, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/403,329

(22) Filed: Aug. 16, 2021

(51) Int. Cl.
*F03D 7/04* (2006.01)
*F03D 17/00* (2016.01)
*F03D 13/20* (2016.01)

(52) U.S. Cl.
CPC ............. *F03D 7/048* (2013.01); *F03D 13/20* (2016.05); *F03D 17/00* (2016.05); *F05B 2270/303* (2013.01); *F05B 2270/329* (2013.01); *F05B 2270/80* (2013.01)

(58) Field of Classification Search
CPC . F03D 7/048; F03D 7/04; F03D 13/20; F03D 80/50; F03D 80/80; F03D 7/02; F05B 2270/329; F05B 2270/303; F05B 2270/80; Y02E 10/72
See application file for complete search history.

(56) References Cited

U.S. PATENT DOCUMENTS

| 4,172,551 A | 10/1979 | Johnson |
| 4,182,456 A | 1/1980 | Paul |
| 4,263,099 A | 4/1981 | Porter |
| 4,453,085 A | 6/1984 | Pryor |
| 4,602,163 A | 7/1986 | Pryor |
| 4,646,388 A | 3/1987 | Weder et al. |

(Continued)

FOREIGN PATENT DOCUMENTS

| CN | 103147917 A | 6/2013 |
| CN | 107630794 A | 1/2018 |

(Continued)

OTHER PUBLICATIONS

C94-M8P, u-blox, ublox RTK Application Board Package https://www.u-blox.com/en/product/c94-m8p.

(Continued)

*Primary Examiner* — Kenneth Bomberg
*Assistant Examiner* — Ryan C Clark
(74) *Attorney, Agent, or Firm* — Dority & Manning, P.A.

(57) ABSTRACT

A system and method are provided for controlling a wind turbine. Accordingly, a controller of the wind turbine determines a thermal gradient of the tower due to solar heating. The controller also determines a displacement of a reference point of the wind turbine from a nominal position resulting from a thermal expansion of a portion of the tower. The displacement includes a displacement magnitude and a displacement direction. The displacement direction is in a radial direction opposite of a maximal peak of the thermal gradient. Additionally, the controller determines a correction factor corresponding to the displacement and a setpoint for a component of the wind turbine based, at least in part, on the correction factor. Finally, an operating state of the wind turbine is established based, at least in part, on the setpoint.

20 Claims, 12 Drawing Sheets

(56) References Cited

U.S. PATENT DOCUMENTS

| | | |
|---|---|---|
| 4,689,472 A | 8/1987 | Singleton et al. |
| 4,695,736 A | 9/1987 | Doman et al. |
| 4,704,051 A | 11/1987 | Ellingvag |
| 4,752,012 A | 6/1988 | Juergens |
| 4,776,521 A | 10/1988 | Weder et al. |
| 4,788,440 A | 11/1988 | Pryor |
| 4,816,043 A | 3/1989 | Harrison |
| 4,852,690 A | 8/1989 | Salmi |
| 4,893,757 A | 1/1990 | Weder et al. |
| 5,038,975 A | 8/1991 | Weder et al. |
| 5,233,200 A | 8/1993 | DiMarcello et al. |
| 5,238,707 A | 8/1993 | Weder et al. |
| 5,255,150 A | 10/1993 | Young et al. |
| 5,336,156 A | 8/1994 | Miller et al. |
| 5,340,608 A | 8/1994 | Weder et al. |
| 5,741,426 A | 4/1998 | McCabe et al. |
| 5,867,404 A | 2/1999 | Bryan |
| 5,956,664 A | 9/1999 | Bryan |
| 5,972,062 A | 10/1999 | Zimmermann |
| 5,987,979 A | 11/1999 | Bryan |
| 6,044,698 A | 4/2000 | Bryan |
| 6,245,218 B1 | 6/2001 | Gibson et al. |
| 6,348,146 B1 | 2/2002 | Gibson et al. |
| 6,388,612 B1 | 5/2002 | Neher |
| 6,392,565 B1 | 5/2002 | Brown |
| 6,650,451 B1 | 11/2003 | Byers et al. |
| 6,679,489 B2 | 1/2004 | Casto et al. |
| 6,819,258 B1 | 11/2004 | Brown |
| 6,838,998 B1 | 1/2005 | Brown et al. |
| 6,876,099 B2 | 4/2005 | Wobben |
| 7,124,631 B2 | 10/2006 | Wobben |
| 7,317,260 B2 | 1/2008 | Wilson |
| 7,337,726 B2 | 3/2008 | Wobben |
| 7,551,130 B2 | 6/2009 | Altenschulte |
| 7,581,360 B2 | 9/2009 | Olsen |
| 7,621,843 B2 | 11/2009 | Madge et al. |
| 7,755,210 B2 | 7/2010 | Kammer et al. |
| 7,921,611 B2 | 4/2011 | Olsen |
| 7,942,629 B2 | 5/2011 | Shi et al. |
| 7,966,318 B2 | 6/2011 | Harshfield |
| 7,970,500 B2 | 6/2011 | Parra Carque |
| 8,058,740 B2 | 11/2011 | Altenschulte et al. |
| 8,155,920 B2 | 4/2012 | Egedal |
| 8,174,137 B2 | 5/2012 | Skaare |
| 8,210,811 B2 | 7/2012 | Loh et al. |
| 8,215,896 B2 | 7/2012 | Kooijman et al. |
| 8,225,559 B2 | 7/2012 | Olsen |
| D672,667 S | 12/2012 | Mix |
| 8,337,706 B2 | 12/2012 | McCabe |
| 8,366,389 B2 | 2/2013 | Hoffmann et al. |
| 8,387,675 B1 | 3/2013 | Vaninger et al. |
| 8,441,138 B2 | 5/2013 | Gjerlov et al. |
| 8,489,247 B1 | 7/2013 | Engler |
| 8,516,114 B2 | 8/2013 | Banavar et al. |
| 8,546,967 B2 | 10/2013 | Ormel et al. |
| 8,606,418 B1 | 12/2013 | Myers et al. |
| 8,691,097 B2 | 4/2014 | McCabe |
| 8,720,127 B2 | 5/2014 | Olsen |
| 8,783,326 B1 | 7/2014 | Vaninger et al. |
| 8,881,485 B2 | 11/2014 | Sritharan et al. |
| 8,915,709 B2 | 12/2014 | Westergaard |
| 8,949,420 B2 | 2/2015 | Banavar et al. |
| 9,016,012 B1 | 4/2015 | Sritharan et al. |
| 9,192,879 B2 | 11/2015 | McCabe |
| 9,212,031 B2 | 12/2015 | Schneider et al. |
| 9,290,095 B2 | 3/2016 | Roth |
| 9,454,859 B2 | 9/2016 | Roth |
| 9,546,499 B2 | 1/2017 | Olsen |
| 9,567,978 B2 | 2/2017 | Marwaha et al. |
| 9,579,655 B2 | 2/2017 | DeJohn et al. |
| 9,587,629 B2 | 3/2017 | Desphande et al. |
| 9,605,558 B2 | 3/2017 | Perley et al. |
| 9,624,905 B2 | 4/2017 | Perley et al. |
| 9,631,606 B2 | 4/2017 | Slack et al. |
| 9,637,139 B2 | 5/2017 | Kathan et al. |
| 9,644,606 B2 | 5/2017 | Agarwal et al. |
| 9,644,608 B2 | 5/2017 | Blom et al. |
| 9,702,345 B2 | 7/2017 | Guadayol Roig |
| 9,751,790 B2 | 9/2017 | McCabe et al. |
| 9,759,068 B2 | 9/2017 | Herrig et al. |
| 9,777,711 B2 | 10/2017 | Rossetti |
| 9,810,199 B2 | 11/2017 | Hammerum |
| 9,822,762 B2 | 11/2017 | Kooijman et al. |
| 9,863,402 B2 | 1/2018 | Perley et al. |
| 9,879,654 B2 | 1/2018 | Peiffer et al. |
| 9,909,569 B2 | 3/2018 | Hammerum et al. |
| 9,909,570 B2 | 3/2018 | Klitgaard et al. |
| 9,926,911 B2 | 3/2018 | Butterworth et al. |
| 9,949,701 B2 | 4/2018 | Meyer et al. |
| 10,006,443 B1 | 6/2018 | Vorobieff et al. |
| 10,023,443 B2 | 7/2018 | Herse et al. |
| 10,036,692 B2 | 7/2018 | Perley et al. |
| 10,047,722 B2 | 8/2018 | Vaddi et al. |
| 10,047,726 B2 | 8/2018 | Sakaguchi |
| 10,087,051 B2 | 10/2018 | Assfalg et al. |
| 10,094,135 B2 | 10/2018 | Olsen |
| 10,155,587 B1 | 12/2018 | Tang |
| 10,184,450 B2 | 1/2019 | Wilson et al. |
| 10,184,456 B2 | 1/2019 | Liu et al. |
| 10,215,157 B2 | 2/2019 | Perley et al. |
| 10,257,592 B2* | 4/2019 | Brinker ................. H04Q 9/00 |
| 10,267,293 B2 | 4/2019 | Peiffer et al. |
| 10,294,923 B2 | 5/2019 | Kristoffersen |
| 10,323,192 B2 | 6/2019 | Quanci et al. |
| 10,328,960 B2 | 6/2019 | Fifield |
| 10,385,826 B2 | 8/2019 | Butterworth et al. |
| 10,410,487 B2 | 9/2019 | Joseph |
| 10,457,893 B2 | 10/2019 | Ure et al. |
| 10,495,060 B2 | 12/2019 | Caruso et al. |
| 10,605,232 B2 | 3/2020 | Aderhold et al. |
| 10,634,120 B2 | 4/2020 | Landa et al. |
| 11,199,175 B1* | 12/2021 | Landa ................. F03D 80/50 |
| 2008/0112807 A1* | 5/2008 | Uphues ................. F03D 7/0224 |
| | | 416/1 |
| 2009/0263245 A1 | 10/2009 | Shi et al. |
| 2010/0126115 A1 | 5/2010 | Lim et al. |
| 2010/0133827 A1 | 6/2010 | Huang et al. |
| 2010/0140936 A1 | 6/2010 | Benito et al. |
| 2010/0140940 A1 | 6/2010 | Kammer et al. |
| 2010/0143128 A1 | 6/2010 | McCorkendale |
| 2011/0140420 A1 | 6/2011 | Loh et al. |
| 2013/0287568 A1 | 10/2013 | Miranda |
| 2014/0003936 A1 | 1/2014 | Agarwal et al. |
| 2014/0241878 A1 | 8/2014 | Herrig et al. |
| 2014/0328678 A1 | 11/2014 | Guadayol Roig |
| 2015/0322925 A1 | 11/2015 | Klitgaard et al. |
| 2016/0222946 A1 | 8/2016 | Krings |
| 2016/0356266 A1 | 12/2016 | Koerber et al. |
| 2017/0306926 A1 | 10/2017 | Deshpande et al. |
| 2018/0187446 A1 | 7/2018 | Homsi |
| 2018/0372886 A1 | 12/2018 | Weber et al. |
| 2019/0203698 A1 | 7/2019 | Muller et al. |
| 2020/0025174 A1 | 1/2020 | Landa et al. |
| 2020/0088165 A1 | 3/2020 | Nielsen et al. |
| 2020/0124030 A1 | 4/2020 | Egedal et al. |

FOREIGN PATENT DOCUMENTS

| | | |
|---|---|---|
| CN | 110500238 B | 6/2020 |
| DE | 102010021643 A1 | 12/2011 |
| DE | 102016117191 A1 | 3/2018 |
| EP | 2466255 A1 | 6/2012 |
| EP | 2306007 B1 | 11/2013 |
| EP | 2063110 B1 | 8/2015 |
| EP | 2599993 B1 | 4/2016 |
| WO | WO2017/174090 A1 | 10/2017 |
| WO | WO2017198481 A1 | 11/2017 |
| WO | WO2020011323 A1 | 1/2020 |

OTHER PUBLICATIONS

NEO-M8P Series, u-blox, u-blox M8 High Precision GNSS Modules. https://www.u-blox.com/en-product/neo-m8p-series.

(56) References Cited

OTHER PUBLICATIONS

Web Page Only https://www.researchgate.net/profile/Mohd_Hafiz_Yahya/publication/261841729/figure/fig1/AS:392498989027332@1470590459207/RTK-GPS-Overview_W640.jpg.

Wikipedia, Real-Time Kinematic (Web Page Only) https://en.wikipedia.org/wiki/Real-time_kinematic.

Wohlert, Measuring Rotor Blades with Lasers, Reducing Wear on Wind Turbines, WindTech International, vol. 12, No. 4, Jun. 2016, 4 Pages.

\* cited by examiner

SYSTEM AND METHOD FOR CONTROLLING A WIND TURBINE

FIELD

The present disclosure relates in general to wind turbines, and more particularly to systems and methods for controlling wind turbines in the presence of solar heating.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to an electrical grid.

In certain instances, the capturing of the kinetic energy of the wind by the rotor blades may result in a displacement of the nacelle from a neutral position. As operational controls of the wind turbines become more sensitive, the displacement of the nacelle may be employed in the generation of various setpoint commands. Accordingly, in order to accurately control the wind turbine, it may be desirable to differentiate a nacelle displacement resulting from an operation of the wind turbine from a nacelle displacement resulting from other factors.

Thus, the art is continuously seeking new and improved systems and methods that address the aforementioned issues relating to the displacement of the nacelle. As such, the present disclosure is directed to systems and methods for controlling a wind turbine in the presence of solar heating.

BRIEF DESCRIPTION

Aspects and advantages of the invention will be set forth in part in the following description, or may be obvious from the description, or may be learned through practice of the invention.

In one aspect, the present disclosure is directed to a method for controlling a wind turbine. The wind turbine may have a nacelle mounted atop the tower. The method may include determining, via a controller, a thermal gradient of the tower due to solar heating for a given sun position. The controller may then determine a displacement of a reference point of the wind turbine from a nominal position resulting from a thermal expansion of a portion of the tower. The displacement may include a displacement magnitude and a displacement direction, and the displacement direction may be in a radial direction opposite a location of a maximal peak of the thermal gradient on the tower. The method may also include determining, via the controller, a correction factor corresponding to the displacement, wherein the correction factor is configured to mitigate an impact of the displacement resulting from the thermal expansion of the portion of the tower. Additionally, the method may include generating, via the controller, a setpoint for a component of the wind turbine based, at least in part, on the correction factor. Further, the method may include establishing an operating state of the wind turbine based, at least in part, on the setpoint.

In another aspect, the present disclosure is directed to a method for controlling a plurality of wind turbines of a wind farm. The plurality of wind turbines may include a designated turbine having a nacelle mounted atop a tower. The method may include determining, via a controller, a thermal gradient of the tower of the designated turbine due to solar heating for a given sun position. The controller may also determine a displacement of a reference point of the designated turbine from a nominal position resulting from a thermal expansion of a portion of the tower. The displacement may include a displacement magnitude and a displacement direction, with the displacement direction being in a radial direction opposite a location of a maximal peak of the thermal gradient on the tower. The controller may also determine a correction factor corresponding to the displacement. The correction factor may be configured to mitigate an impact of the displacement resulting from the thermal expansion of the portion of the tower. The method may also include implementing, via the controller, the correction factor at each additional wind turbine of the plurality of wind turbines and determining, via the controller, a setpoint for a component of each wind turbine of the plurality of wind turbines based, at least in part, on the correction factor. Additionally, the method may include establishing an operating state of each wind turbine of the plurality of wind turbines based, at least in part, on the setpoint.

In another aspect, the present disclosure is directed to a system for controlling a wind turbine. The system may include a tower having a plurality of vertically arranged tower segments and a nacelle mounted atop the tower. Additionally, the system may include a controller. The controller may include at least one processor configured to perform a plurality of operations. The plurality of operations may include any of the operations and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
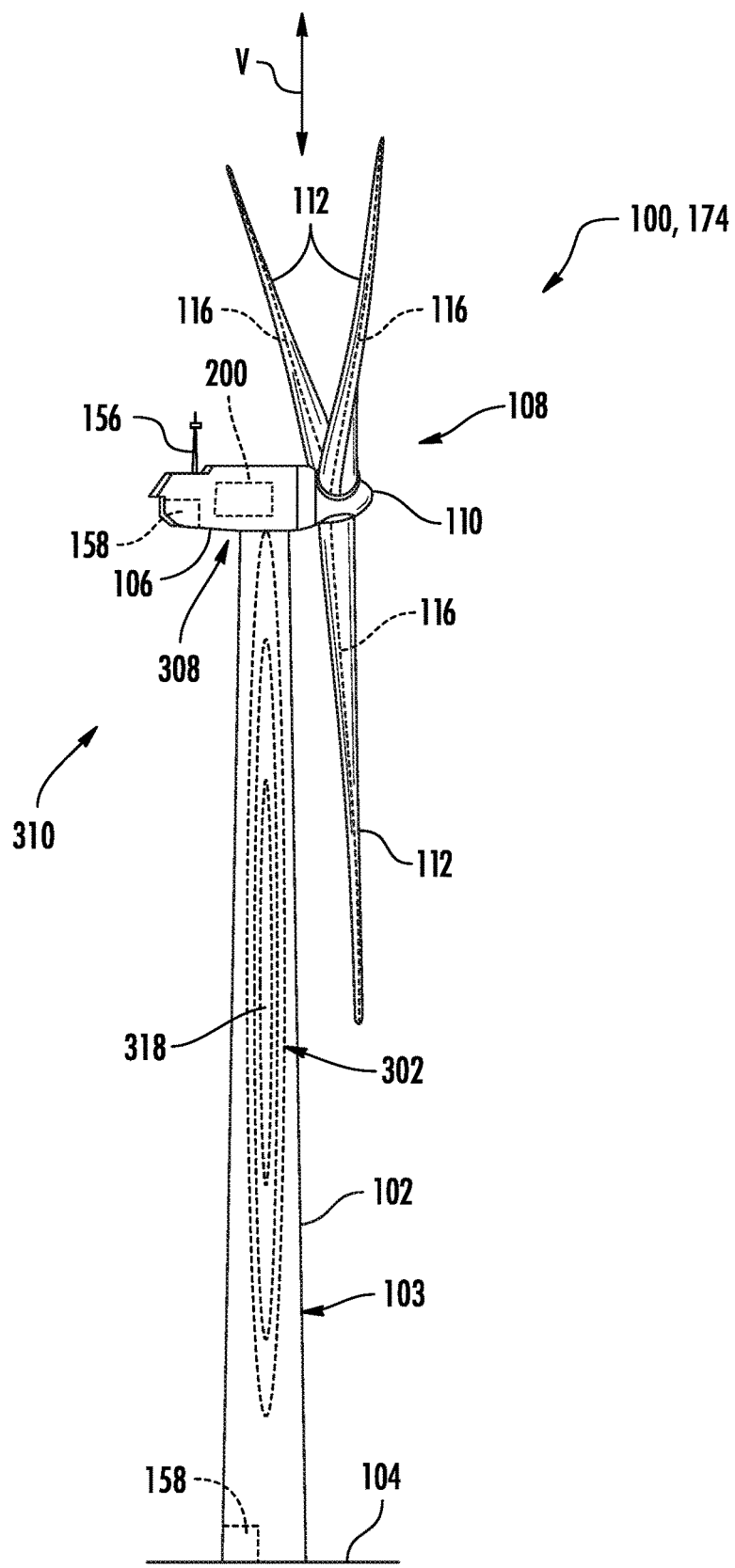
FIG. 1 illustrates a perspective view of one embodiment of a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to systems and methods for controlling a wind turbine and/or wind farm in the presence of solar heating as the consequences of solar heating may affect the control systems implemented by the wind turbine. More specifically, for certain control systems implemented by wind turbines, the displacement of the nacelle from a nominal position may be an important control input variable. Accordingly, it may be desirable to account/correct for displacements of the nacelle which may stem from causes other than the operation of the wind turbine.

For example, the displacement of the nacelle due to the operation of the wind turbine may be utilized to determine a performance of the wind turbine in order to determine whether various controllable properties (e.g., pitch, yaw, and/or generator torque setpoints) of the turbine are optimized for current wind conditions. If the displacement due to other causes is in the same direction as the displacement of interest, then the combined displacement may indicate to the controller a performance that is greater than the actual performance. Similarly, if the displacement due to other causes opposes the displacement of interest, then the combined displacement may indicate to the controller that the performance is less than the actual performance. Either scenario may result in the controller operating the wind turbine in a sub-optimal manner for the given wind conditions. Therefore, mitigating the impact of the displacement due to other causes may increase the alignment of the wind turbine controller setpoints to nominal setpoints for the given wind conditions, thereby improving the power output and/or life expectancy of the wind turbine/wind farm.

One such displacement due to other causes may stem from uneven solar heating of the tower of the wind turbine. For example, during daylight hours, an exposed face of the wind turbine may be subjected to direct sunlight while a non-exposed face of the tower may be in a shadow generated by the tower itself. As a result, the exposed face may be heated to a greater extent than the portion of the tower that is in shadow. Accordingly, the exposed face may experience a greater degree of thermal expansion than the shadowed face. The thermal expansion of the exposed face may result in an increase in height of the exposed face, while the height of the shadowed face remains relatively unchanged. The resultant height differential between the exposed face and shadowed face may lead to the development of a bend in the tower, which may be evidenced by a displacement of a reference point.

It should be appreciated that the direction of the bend may be oriented opposite the portion of the tower subjected to the maximal thermal heating (e.g., a maximal peak of a thermal gradient on the tower) at any given time. It should also be appreciated that the severity of the bend (e.g., the magnitude of the displacement of the reference point) may be influenced by the amount of solar heating of the exposed face and the coefficient of thermal expansion of the tower material. For example, the amount of solar heating, and/or the focus/concentration thereof, may be impacted by the elevation of the sun above the horizon, and therefore, the season.

The systems and methods disclosed herein may be utilized to determine a thermal gradient of the tower due to solar heating. Determining the thermal gradient may include determining the location of a maximal peak of the thermal gradient and/or the magnitude thereof. Based on the thermal gradient, the systems may facilitate the determination of both a displacement magnitude and a displacement direction resulting from the solar heating. A correction factor may then be determined so as to mitigate an impact of the displacement. The correction factor may be used to establish a setpoint for a component of the wind turbine and, thus, an operating state of the wind turbine may be established.

Referring now to the drawings, FIG. 1 illustrates a perspective view of one embodiment of a wind turbine 100 according to the present disclosure. As shown, the wind turbine 100 generally includes a tower 102 extending from a support surface 104, a nacelle 106, mounted on the tower 102, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator 118 (FIG. 2) of an electrical system 150 (FIG. 2) positioned within the nacelle 106 to permit electrical energy to be produced.

The wind turbine 100 may also include a controller 200 centralized within the nacelle 106. However, in other embodiments, the controller 200 may be located within any other component of the wind turbine 100 or at a location outside the wind turbine. Further, the controller 200 may be communicatively coupled to any number of the components of the wind turbine 100 in order to control the components. As such, the controller 200 may include a computer or other suitable processing unit. Thus, in several embodiments, the controller 200 may include suitable computer-readable instructions that, when implemented, configure the controller 200 to perform various different functions, such as receiving, transmitting and/or executing wind turbine control signals.

Figure 2:
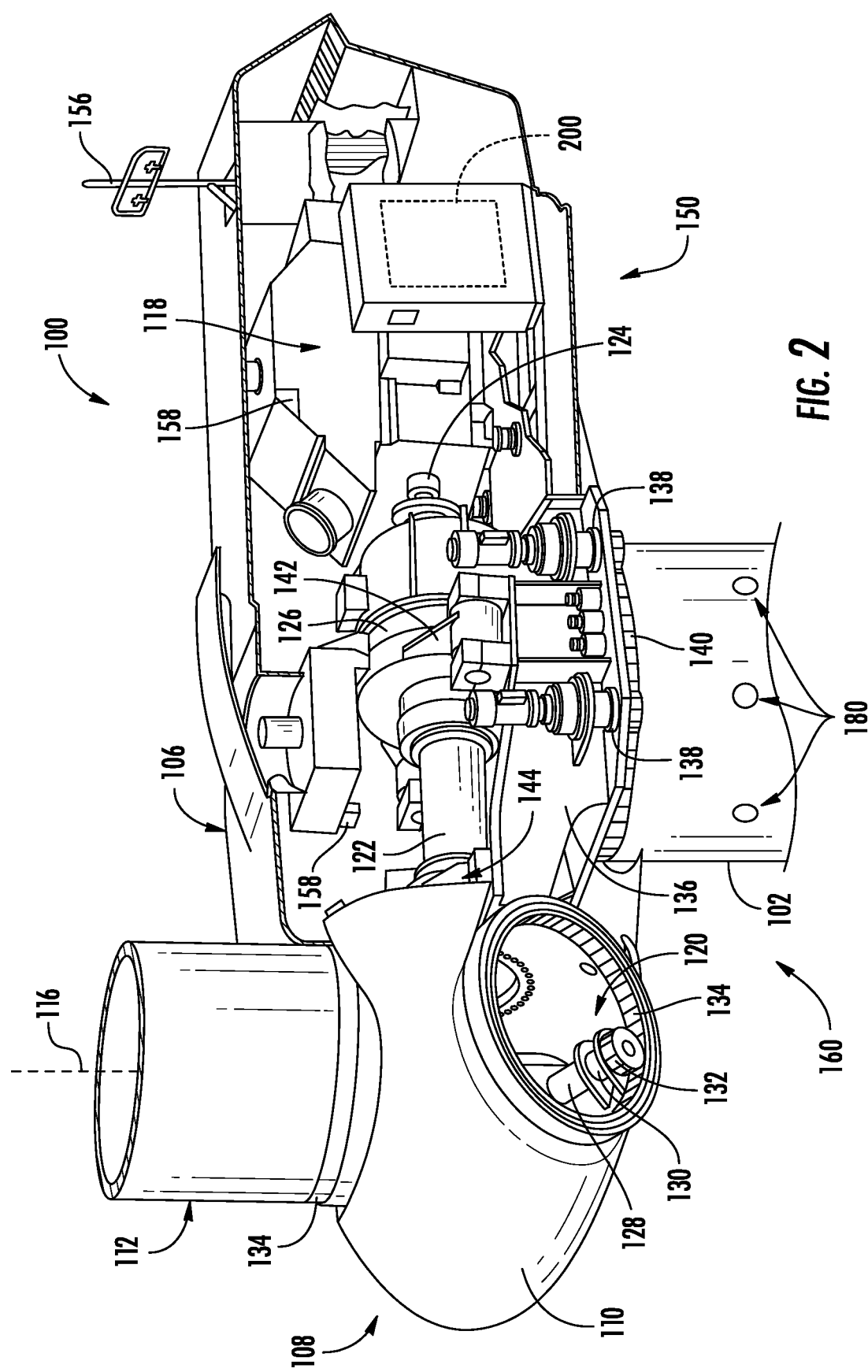
FIG. 2 illustrates a perspective, internal view of one embodiment of a nacelle of the wind turbine according to the present disclosure.

Referring now to FIG. 2, a simplified, internal view of one embodiment of the nacelle 106 of the wind turbine 100 shown in FIG. 1 is illustrated. As shown, the generator 118 may be coupled to the rotor 108 for producing electrical power from the rotational energy generated by the rotor 108 when in operation. For example, as shown in the illustrated embodiment, the rotor 108 may include a rotor shaft 122 coupled to the hub 110 for rotation therewith. The rotor shaft 122 may be rotatably supported by a main bearing 144. The rotor shaft 122 may, in turn, be rotatably coupled to a high-speed shaft 124 of the generator 118 through an optional gearbox 126 connected to a bedplate support frame 136 by one or more torque arms 142. As is generally understood, the rotor shaft 122 may provide a low-speed, high-torque input to the gearbox 126 in response to rotation of the rotor blades 112 and the hub 110. The gearbox 126 may then be configured with a plurality of gears 148 to convert the low-speed, high-torque input to a high-speed, low-torque output to drive the high-speed shaft 124 and, thus, the generator 118. In an embodiment, the gearbox 126 may be configured with multiple gear ratios so as to produce varying rotational speeds of the high-speed shaft for a given low-speed input, or vice versa.

Each rotor blade 112 may also include a pitch control mechanism 120 configured to rotate the rotor blade 112 about its pitch axis 116. Each pitch control mechanism 120 may include a pitch drive motor 128 (e.g., any suitable electric, hydraulic, or pneumatic motor), a pitch drive gearbox 130, and a pitch drive pinion 132. In such embodiments, the pitch drive motor 128 may be coupled to the pitch drive gearbox 130 so that the pitch drive motor 128 imparts mechanical force to the pitch drive gearbox 130. Similarly, the pitch drive gearbox 130 may be coupled to the pitch drive pinion 132 for rotation therewith. The pitch drive pinion 132 may, in turn, be in rotational engagement with a pitch bearing 134 coupled between the hub 110 and a corresponding rotor blade 112 such that rotation of the pitch drive pinion 132 causes rotation of the pitch bearing 134. Thus, in such embodiments, rotation of the pitch drive motor 128 drives the pitch drive gearbox 130 and the pitch drive pinion 132, thereby rotating the pitch bearing 134 and the rotor blade(s) 112 about the pitch axis 116. Similarly, the wind turbine 100 may include one or more yaw drive mechanisms 138 communicatively coupled to the controller 200, with each yaw drive mechanism(s) 138 being configured to change the angle of the nacelle 106 relative to the wind (e.g., by engaging a yaw bearing 140 of the wind turbine 100).

In an embodiment, the wind turbine 100 may include an environmental sensor 156 configured for gathering data indicative of one or more environmental conditions. The environmental sensor 156 may be operably coupled to the controller 200. Thus, in an embodiment, the environmental sensor(s) 156 may, for example, be a wind vane, an anemometer, a lidar sensor, thermometer, barometer, or any other suitable sensor. The data gathered by the environmental sensor(s) 156 may include measures of wind speed, wind direction, wind shear, wind gust, wind veer, atmospheric pressure, and/or temperature. In at least one embodiment, the environmental sensor(s) 156 may be mounted to the nacelle 106 at a location downwind of the rotor 108. The environmental sensor(s) 156 may, in alternative embodiments, be coupled to, or integrated with, the rotor 108. It should be appreciated that the environmental sensor(s) 156 may include a network of sensors and may be positioned away from the turbine 100.

In addition, the wind turbine 100 may include a at least one operational sensor 158. The operational sensor(s) 158 may be configured to detect a performance of the wind turbine 100 (e.g., in response to the environmental conditions). For example, the operational sensor(s) 158 may be a rotational speed sensor operably coupled to the controller 200. The operational sensor(s) 158 may be directed at the rotor 108 of the wind turbine 100, the rotor shaft 122 of the wind turbine 100 and/or the generator 118. The operational sensor(s) 158 may gather data indicative of the rotational speed and/or rotational position of the rotor shaft 122, and thus the rotor 108 in the form of a rotor speed and/or a rotor azimuth. The operational sensor(s) 158 may, in an embodiment, be an analog tachometer, a D.C. tachometer, an A.C. tachometer, a digital tachometer, a contact tachometer a non-contact tachometer, or a time and frequency tachometer. In an embodiment, the operational sensor(s) 158 may, for example, be an encoder, such as an optical encoder. For example, the operational sensor(s) 158 may be configured to monitor the speed of the rotor 108 based on a passage of a rotating feature, such as a plurality of bolts securing the hub 110 to the rotor shaft 122. In an additional embodiment, the operational sensor(s) 158 may be at least one accelerometer and/or position sensor coupled to the nacelle 106 and configured to detect a displacement from a nominal position thereof.

Figure 10:
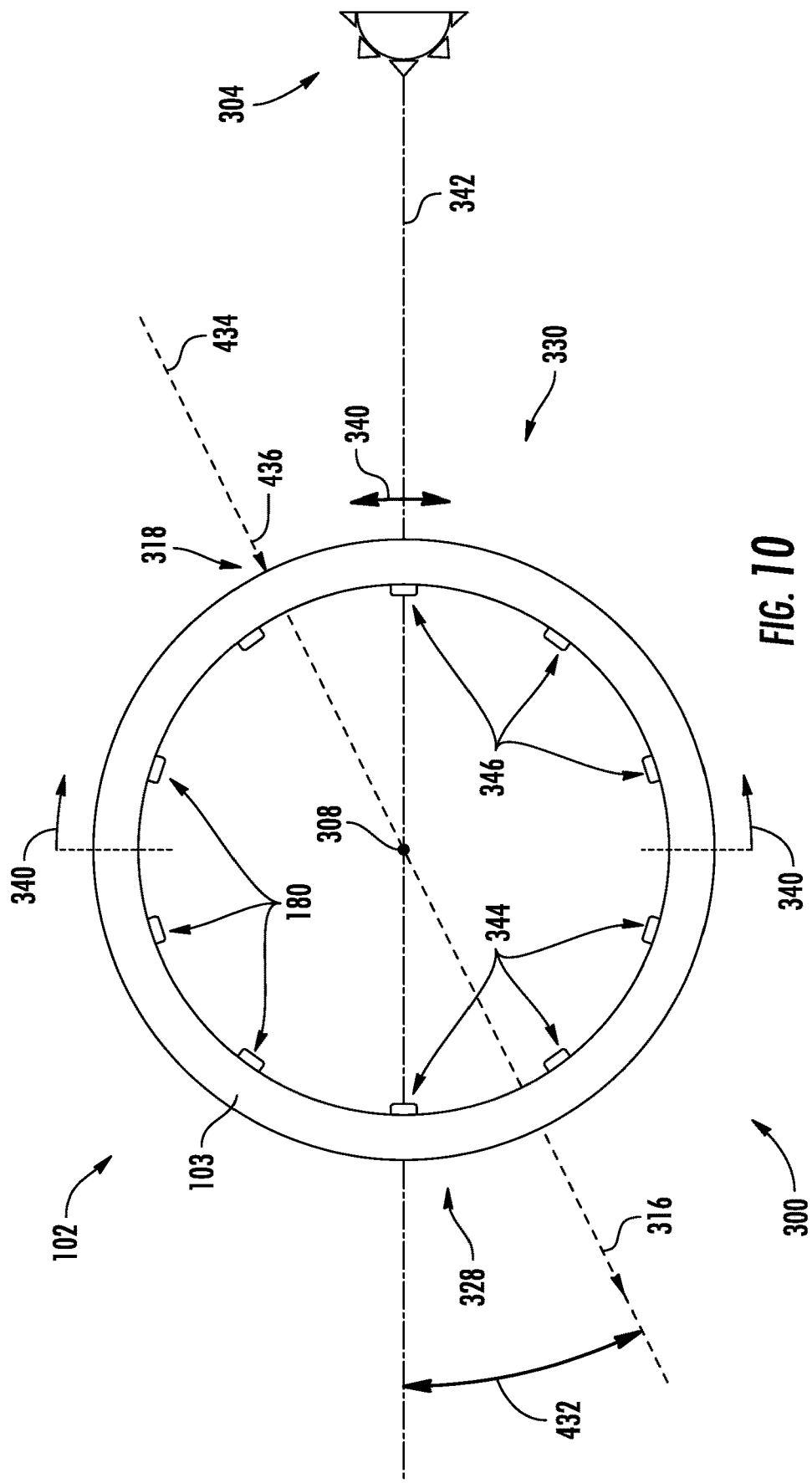
FIG. 10 illustrates a horizontal cross-sectional view of a portion of the wind turbine tower according to the present disclosure.

In an embodiment, the wind turbine may include a plurality of temperature sensors 180. The plurality of temperature sensors 180 may be distributed circumferentially about the vertical axis (V) of the wind turbine 100. The plurality of temperature sensors 180 may be operationally coupled to the tower 102 to detect a temperature thereof. In an embodiment, the plurality of temperature sensors 180 may be positioned radially inward of an outer face of the tower 102. For example, in an embodiment such as depicted in FIG. 10, at least a portion of the plurality of temperature sensors 180 may be coupled to an inner face of the tower 102 and/or embedded, at least partially, within the tower wall 103. However, in an additional embodiment, at least a portion of the plurality of temperature sensors 180 may be positioned radially outward of the tower wall. It should be appreciated that the plurality of temperature sensors 180 may include contact sensors and/or non-contact sensors. For example, the plurality of temperature sensors 180 may include electromechanical, resistive and/or electronic sensors, such as thermistors, resistive temperature detectors, thermocouples, semiconductor junction sensors, infra-red sensors, thermal radiation sensors and/or combinations thereof.

It should also be appreciated that, as used herein, the term "monitor" and variations thereof indicates that the various sensors of the wind turbine 100 may be configured to provide a direct measurement of the parameters being monitored or an indirect measurement of such parameters. Thus, the sensors described herein may, for example, be used to generate signals relating to the parameter being monitored, which can then be utilized by the controller 200 to determine a condition or response of the wind turbine 100.

Figure 3:
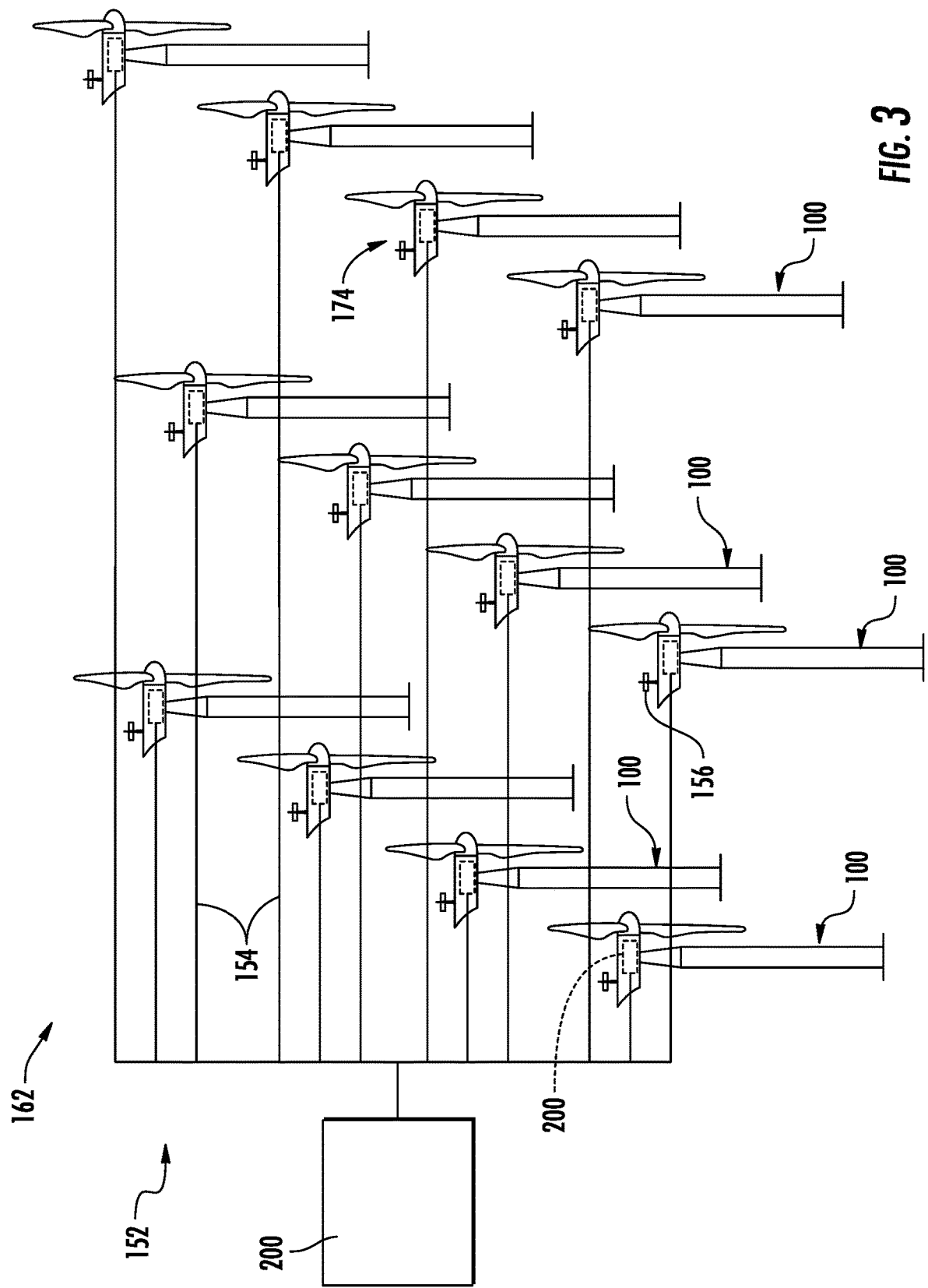
FIG. 3 illustrates a schematic diagram of one embodiment of a wind farm having a plurality of wind turbines according to the present disclosure.
Figure 4:
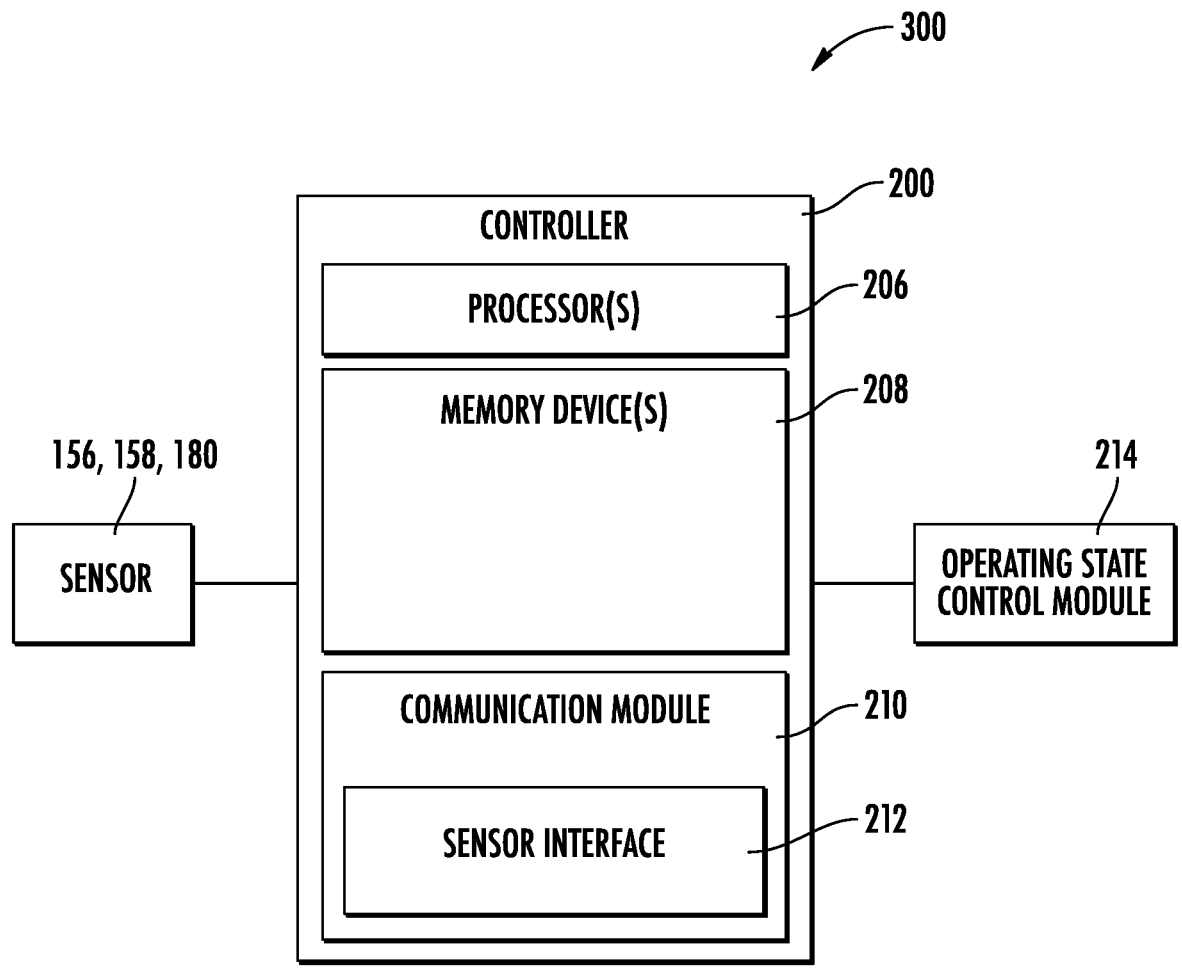
FIG. 4 illustrates a block diagram of one embodiment of a controller for use with the wind turbine according to the present disclosure.

In an embodiment, such as depicted in FIG. 3, the wind turbine 100 may be one of a plurality of wind turbines 162 of a wind farm 152 and the controller 200 may be configured as a farm controller. For example, as shown in the illustrated embodiment of FIG. 3, the wind farm 152 may include twenty-two wind turbines 100. However, in other embodiments, the wind farm 152 may include any other number of wind turbines 100, such as less than twelve wind turbines 100 or greater than twelve wind turbines 100. In one embodiment, the controller(s) 200 may be communicatively coupled via a wired connection, such as by connecting the controller(s) through suitable communicative links 154 (e.g., a suitable cable). Alternatively, the controller(s) may be communicatively coupled through a wireless connection, such as by using any suitable wireless communications protocol known in the art.

Referring now to FIGS. 4-11, multiple embodiments of a system 300 for controlling the wind turbine 100 according to the present disclosure are presented. As shown particularly in FIG. 4, a schematic diagram of one embodiment of suitable components that may be included within the system 300 is illustrated. For example, as shown, the system 300 may include the controller 200 communicatively coupled to the operational sensor(s) 158 and/or environmental sensor(s) 156. Further, as shown, the controller 200 includes one or more processor(s) 206 and associated memory device(s) 208 configured to perform a variety of computer-implemented functions (e.g., performing the methods, steps, calculations and the like and storing relevant data as disclosed herein). Additionally, the controller 200, may also include a communications module 210 to facilitate communications between the controller 200, and the various components of the wind turbine 100. Further, the communications module 210 may include a sensor interface 212 (e.g., one or more analog-to-digital converters) to permit signals transmitted from the sensor(s) 156, 158, 180 to be converted into signals that can be understood and processed by the processors 206. It should be appreciated that the sensor(s) 156, 158, 180 may be communicatively coupled to the communications module 210 using any suitable means. For example, the sensor(s) 156, 158, 180 may be coupled to the sensor interface 212 via a wired connection. However, in other embodiments, the sensor(s) 156, 158, 180 may be coupled to the sensor interface 212 via a wireless connection, such as by using any suitable wireless communications protocol known in the art. Additionally, the communications module 210 may also be operably coupled to an operating state control module 214 configured to change at least one wind turbine operating state.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206, configure the controller 200 to perform various functions including, but not limited to, determining a thermal gradient due to solar heating, determine a displacement of a reference point resulting from a thermal expansion, determining correction factor corresponding to the displacement, generating a set point for a component of the wind turbine, and establishing an operating state of the wind turbine based, at least in part, on the setpoint as described herein, as well as various other suitable computer-implemented functions.

Referring still to FIGS. 4-11, in an embodiment, the controller 200 may be configured to implement process 400 by to determine a thermal gradient 302 of the tower 102. The thermal gradient 302 may be indicative of the solar heating of the tower 102 for a given sun position 304. For example, the thermal gradient 302 may be indicative of circumferential variations in the temperature of a tower wall 103 of the tower 102. Additionally, the controller 200 may be configured to determine a displacement 306 of a reference point 308 of the wind turbine 100 from a nominal position 310. The displacement 306 may result from a thermal expansion of a portion 312 of the tower 102. In an embodiment, the displacement may include a displacement magnitude 314 and a displacement direction 316. The displacement direction 316 may be in a radial direction (relative to a vertical axis (V) of the tower 102) that is opposite a location of a maximal peak 318 of the thermal gradient 302 on the tower 102. In an embodiment, the controller 200 may also be configured to implement process 500 to determine a correction factor 320. The correction factor 320 may correspond to the displacement 306. The correction factor 320 may be configured to mitigate an impact of the displacement 306 resulting from the thermal expansion of the portion 312 of the tower 102. The controller 200 may also generate a setpoint 322 for a component 160 of the wind turbine 100. The setpoint 322 may be based, at least in part, on the correction factor 320. Further, an operating state 324 of the wind turbine 100 may be established based, at least in part, on the setpoint 322.

In order to determine the displacement 306 of the reference point 308, the controller 200 may, in an embodiment, determine a temperature differential 326 between a shadowed face 328 of the tower 102 and an exposed face 330 of the tower 102 as indicated by the thermal gradient 302. The difference in temperature between the shadowed face 328 and the exposed face 330 may result in differing expansions of the corresponding portions of the tower wall 103. It should be appreciated that the exposed face 330 may be defined by an arc 340 extending either side of the azimuth 342 of the sun at a given instant. Accordingly, the portion of the tower 102 covered by the arc 340 at the given instant may be illuminated by the sun and, therefore, subjected to solar heating due to solar radiation, while the portion of the tower 102 following outside of the arc 340 may be shadowed.

In an embodiment, the controller 200 may determine an increase 332 in a height of the exposed face 330. The increase 332 in height may be determined based on a coefficient of thermal expansion of a tower material (e.g., the material of the tower wall 103) and the temperature differential 326. It should be appreciated that the temperature of the tower wall 103 due to solar heating may be greater (as indicated by the maximal peak 318 of the thermal gradient 302) on the exposed face 330 than on the shadowed face 328. Accordingly, the portion of the tower wall 103 corresponding to the exposed face 330 may expand to a greater degree than the portion of the tower wall 103 corresponding to the shadowed face 328. As such, the displacement magnitude 314 may be based, at least in part, on the increase 332 in the height.

Figure 11:
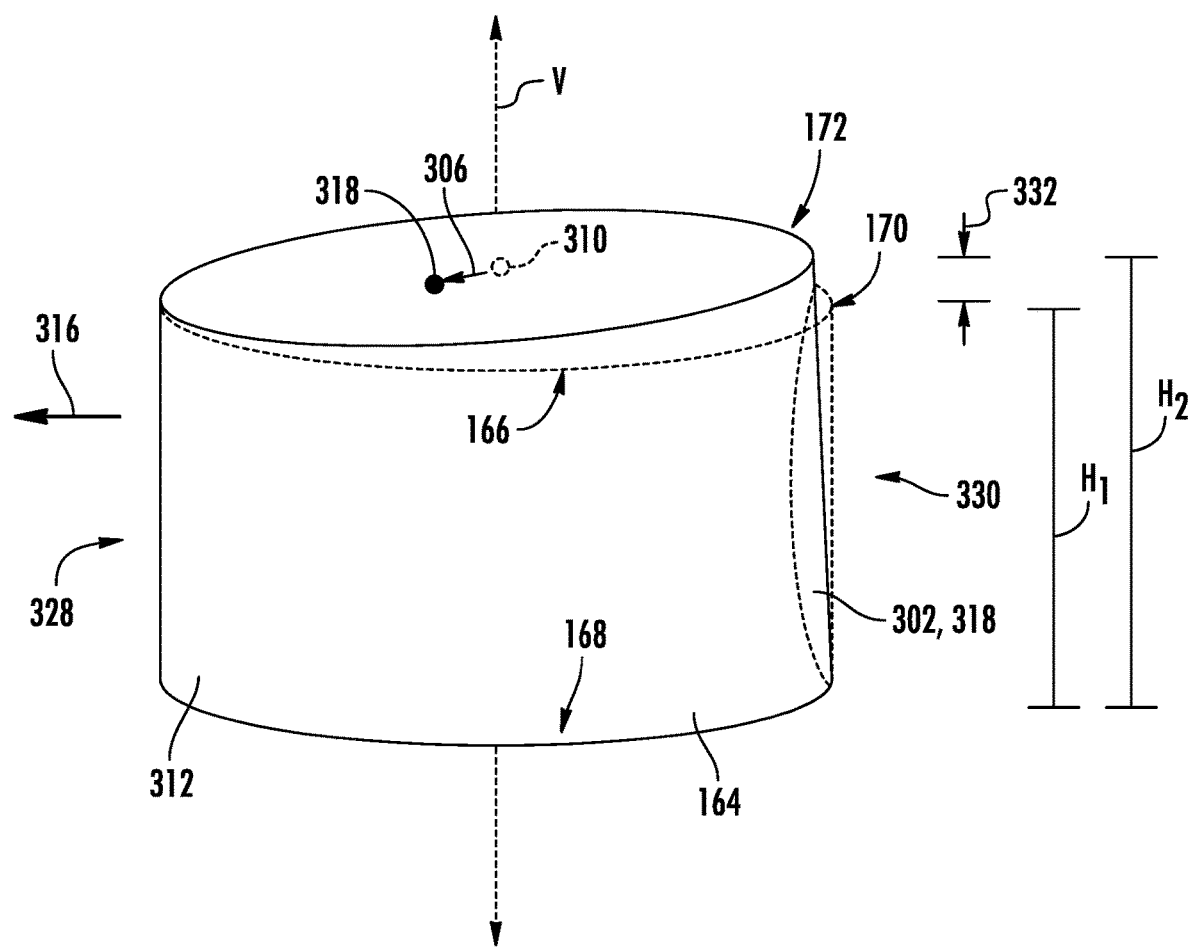
FIG. 11 illustrates a perspective view of a portion of the wind turbine tower according to the present disclosure.

For example, in an embodiment, the tower 102 may include a plurality of vertically arranged tower segments 164. The tower segment(s) 164 may have a generally cylindrical or frustum-shaped structure. The tower segment(s) 164 may include a generally horizontal upper face 166 and a generally horizontal lower face 168 when in a nominal orientation 170 (e.g., when not subjected to uneven thermal expansion). The distance between the generally horizontal upper face 166 and the generally horizontal lower face 168 may define a nominal height ($H_1$) of the tower segment(s) 164. However, when thermal expansion resulting from solar heating is present, the upper face 166 and/or the lower face 168 may depart the nominal orientation 170 and establish a displaced orientation 172. For example, as depicted in FIG. 11, when in the displaced orientation 172 the height ($H_2$) of the exposed face 330 may increase to a greater degree than the height of the shadowed face 328, which may remain at essentially the nominal height ($H_1$) resulting in the upper face 166 and/or the lower face 168 having a canted orientation relative to horizontal. It should be appreciated that the difference between the height ($H_2$) of the exposed face 330 when displaced and a nominal height ($H_1$) may correspond to the increase 332 in the height exposed face 330 and, therefore, the displacement magnitude 314 of the reference point 308 due to solar heating.

In an embodiment, the plurality of vertically arranged tower segments 164 may be a plurality of virtual tower segments 164. For example, in an embodiment wherein the tower 102 may be a unitary structure (e.g., having a single segment extending between the support surface 104 and the nacelle 106), the tower 102 may be mathematically divided into a plurality of virtual tower segments 164. By way of additional example, in an embodiment, the plurality of vertically arranged tower segments 164 be subdivided into the plurality of virtual tower segments 164. It should be appreciated that the employment of virtual tower segments 164 may, in an embodiment, facilitate the determination of the increase 332 in the height of the exposed face 330.

As depicted at 334, in an embodiment, the controller 200 may determine the increase 332 in the height of the exposed face 330 of the tower 102 by determining the temperature differential 326 for each tower segment 164 of the plurality of tower segments 164. Based on the temperature differential 326 for each tower segment 164, the controller 200 may, as depicted at 336, determine an increase 332 in height of an exposed face 330 of each tower segment 164 of the plurality of segments 164. As is further depicted at 338, the controller 200 may then combine the increase 332 in height of the exposed face 330 of each tower segment 164 of the plurality of tower segments 164 to determine the increase 332 in height of the exposed face 330 of the tower 102. In other words, the deviations from the nominal orientation 170 for each tower segment(s) 164, as reflected by the displaced orientation(s) 172 of the tower segment(s) 164, may accumulate. This accumulation may result in the displacement 306 of the reference point 308. It should, therefore, be appreciated that the displacement magnitude 314 may be proportional to the increase 332 in the height of the exposed face 330 of the tower 102. For example, a greater increase 332 in the height of the exposed face 330 of the tower 102 may result in a higher displacement magnitude 314 of the reference point 308 than may result from a lesser increase 332, such as may be encountered when the temperature differential 326 is minimal.

In an embodiment, the system 300, implementing the process 400, may utilize the plurality of temperature sensors 180 in the determination of the thermal gradient 302. Accordingly, a plurality of temperature indications 402 may be received from the plurality of temperature sensors 180. Each of the plurality of temperature indications 402 may correspond to a tower temperature at the location of each temperature sensor 180. For example, in an embodiment, the thermal gradient 302 may be a circumferential thermal gradient 302 that is based on the plurality of temperature indications 402 received from the plurality of temperature sensors 180.

It should be appreciated that, in an embodiment, the location of each temperature sensor 180 of the plurality of temperature sensor 180 may correspond to the sensed location of the tower rather than the physical location of a body of the temperature sensor 180. For example, when employing a non-contact temperature sensor, the location of each temperature sensor 180 may refer to the portion of the tower 102 at which a sensing element of the temperature sensor(s) 180 is directed, aimed, or oriented.

A first portion 404 of the plurality of temperature sensors 180 may, in an embodiment, be operably coupled to the shadowed face 328. Additionally, a second portion 406 of the plurality of temperature sensors 180 may be operably coupled to the exposed face 330. It should be appreciated that the number of temperature sensors 180 of the second portion 406 may be greater than or equal to the number of temperature sensors 180 of the first portion 404. It should further be appreciated that the particular temperature sensors 180 of the plurality of temperature sensors 180 included within the first portion 404 and the second portion 406 may vary as the azimuth to the sun position 304 advances across the sky. For example, a temperature sensor 180 may be coupled to the shadowed face 228 in the morning but may be illuminated by the sun at noon. Therefore, the temperature sensor 180 may transition from the second portion 406 to the first portion 404.

The temperature indications 402 may, in an embodiment, be utilized by the controller to determine the temperature differential 326. For example, the controller 200 may determine a shadowed-face temperature 408 for the shadowed face 328. The shadowed-face temperature 408 may be based on an average of the temperature indications 402 from each temperature sensor 180 of the first portion 404 of the plurality of temperature sensors 180 at a given instant.

In addition to determining the shadowed-face temperature 408, the controller 200 may, in an embodiment, determine a maximal temperature indication 410 of the second portion 406 of the plurality of temperature sensors 180 at the given instant. The controller 200 may then determine an exposed-face temperature 412 for the exposed face 330. The exposed-face temperature 412 may be based, at least in part, on the maximal temperature indication 410. The exposed-face temperature 412 may correspond to a designated percentage 414 of the maximal temperature indication 410. As such, the exposed-face temperature 412 may be less than or equal to the maximal temperature indication 410. The controller 200 may, in an embodiment, subtract the shadowed-face temperature 408 from the exposed-face temperature 412 to determine the temperature differential 326 between the shadowed face 328 of the tower 102 and the exposed face 330 of the tower.

It should be appreciated that the maximal temperature indication 410 (e.g., the maximal peak 318 of the thermal gradient) may represent the temperature of a relatively small portion the exposed face 330, with the remainder (e.g., the majority) of the area of the exposed face 330 having a lesser temperature. As such the remainder of the exposed face 330 may exhibit less thermal expansion than would be projected/anticipated based on the maximal temperature indication 410. Insofar as the entirety of the exposed face 330 may not exhibit the degree of thermal expansion exhibited by the portion of the exposed face 330 corresponding to the maximal temperature indication 410, the utilization a percentage of the maximal temperature indication 410 as the exposed-face temperature 412 may improve the accuracy of the determination of the displacement magnitude 314.

Determining the temperature differential 326 via the process 400 may, in an embodiment, include receiving a plurality of historical environmental observations 416. The plurality of historical environmental observations 416 may be received at a plurality of sampling intervals 418. The plurality of sampling intervals 418 may be indicative of a date and a time of day. The plurality of historical environmental observations 416 may, in various embodiments, include indications of ambient temperature, precipitation level, and/or cloud cover. It should be appreciated that the plurality of historical environmental observations 416 may be correlated to a given sun position 304 at the indicated date and time of day.

In addition to the plurality of historical environmental observations 416, the controller 200 may, in an embodiment, receive a plurality of historical temperature indications 420 for the tower 102 at the plurality of sampling intervals 418. The plurality of historical temperature indications 420 may, for example, be a plurality of temperature indications 402 received from the plurality of thermal sensors 180. However, it should be appreciated that the plurality of historical temperature indications 420 may be recorded from any other suitable sensing means. In an embodiment, the plurality of historical temperature indications 420 may be received as a plurality of historical thermal gradients.

In an embodiment, the controller 200 may determine an environmental-tower temperature correlation 422. The environmental-tower temperature correlation 422 may be indicative of a response of the tower 102 to the environmental conditions affecting the wind turbine 100 at a given time. For example, the environmental-tower temperature correlation 422 may indicate that a particular thermal gradient 302 (e.g., an exposed-based temperature 412 and a shadowed-based temperature 408) is developed whenever the environmental conditions correspond to a particular ambient temperature and cloud cover during daylight hours. The environmental-tower temperature correlation 422 may be a lookup table, a graphical representation, a computer-implemented function, and/or a combination thereof.

Following the determination of the environmental-tower temperature correlation 422, the controller 200 may be configured to receive current environmental data 424, which may include an environmental observation at the current date and time. The controller 200 may, as indicated at 426, then determine the temperature differential 326 based on the environmental-tower temperature correlation 422 and the environmental observation at the current date and time. In other words, the controller 200 may leverage the various recorded responses of the tower 102 to various historical environmental observations 416 to determine a current response (e.g., the temperature differential 326) of the tower 102 to the currently prevailing environmental conditions. It should be appreciated that utilizing the environmental-tower temperature correlation 422 to determine the current temperature differential 326 of the tower 102 may facilitate the utilization of a current environmental observation (from the current environmental data 424) to determine the current displacement magnitude 314 of the reference point 308.

As particularly illustrated in FIGS. 8-11, the displacement direction 316 may be in a radial direction opposite the location of the maximal peak 318 of the thermal gradient 302 on the tower 102. The location of the maximal peak 318 for a given sun position 304 may be identified by determining the thermal gradient 302 for the given sun position 304. In other words, determining the thermal gradient 302 may include determining both the contours of thermal gradient 302 indicative of the temperature variations of the tower 102 and the orientation of the thermal gradient 302 relative to the tower. It should be appreciated that the orientation of the thermal gradient 302 may rotate about the vertical axis (V) of the tower 102 in response to changes in the sun position 304 during daylight hours.

In order to determine the displacement direction 316, the controller 200 may, in an embodiment, determine the azimuth angle 342 of the sun relative to the wind turbine 100 for a given sun position 304. As depicted at 428, the controller 200 may then determine the thermal gradient 302 based, at least in part, on the azimuth angle 342 of the sun. It should however be appreciated that the maximal peak 318 of the thermal gradient 302, and thus the displacement direction 316 may not be aligned with the azimuth angle 342 of the sun. For example, because of the time required for the temperature of the portion of the exposed face 330 to rise in response to the solar heating, the maximal peak 318 may lag the azimuth angle 342 of the sun as the sun advances across the sky (e.g., along the sun path (SP)) during daylight hours.

In addition to the azimuth angle 342 of the sun, the circumferential position 436 of the maximal peak 318 of the thermal gradient 302 may also be affected by the elevation angle 430 of the sun. Specifically, the elevation angle 430 of the sun may influence the angle at which the solar radiation impacts the generally vertical surface of the tower 102. The angle at which the solar radiation impacts the tower 102 may, in turn, affect the rate at which the temperature of the impacted portion of the exposed face 330 increases due to solar heating.

For example, the different elevation angles 430 of the sun in the winter and summer months may result in differing impact angles of the solar radiation on the tower 102. During the winter months, the sun may have a lower elevation angle 430 than in the summer months. Thus, the solar radiation may impact the tower 102 at an angle that is more perpendicular in the winter months than in the summer months the more direct impact of the solar radiation in the winter months may result in the relatively rapid heating of the portion of the exposed face 330 lying along the azimuth to the sun. As such, there may be less deviation between the azimuth angle 342 of the sun and the circumferential position 436 of the maximal peak 318 during the winter months than during the summer months. Similarly, the less direct impact of the solar radiation in the summer months may result in a slower heating of the portion of the exposed face 330, resulting in a greater deviation between the azimuth angle 342 of the sun and the circumferential position 436 the maximal peak 318 during the summer months than during the winter months.

Accordingly, in an embodiment, the process 400 of the system 300 may include determining the elevation angle 430 of the sun above the horizon relative to the wind turbine 100 for the given sun position 304. The controller 200 may then determine an azimuth offset 432 for the thermal gradient 302. The azimuth offset 432 may be based, at least in part, on the elevation angle 430. For example, in an embodiment, the azimuth offset 432 may be proportional to the secant of the elevation angle 430.

Figure 9:
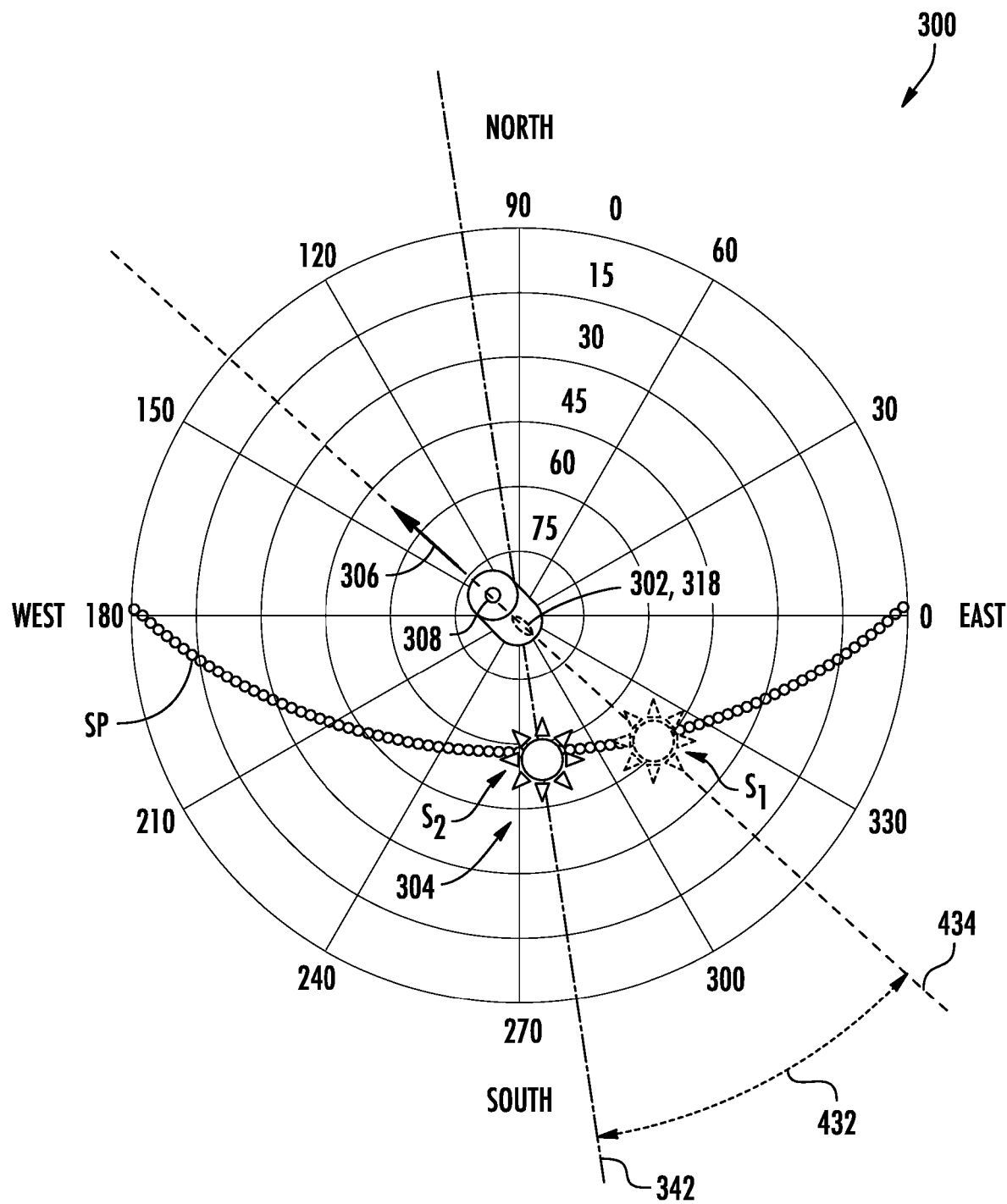
FIG. 9 illustrates an overhead view of the tower of FIG. 8 particularly illustrating a displacement of a reference point positioned at the tower top relative to the tower base according to the present disclosure.

As particularly illustrated in FIG. 9, the azimuth offset 432 may correspond to an angular difference between the azimuth angle 342 of the sun and an azimuth angle 434 of the location of the maximal peak 318 of thermal gradient 302 on the tower 102. It should be appreciated that the azimuth offset 432 may reflect an angular distance traversed by the sun in the amount of time that may elapse (e.g., a delay) between the instant the azimuth angle 342 of the sun intersects a particular portion of the exposed face 330 and the instant that the maximal peak 318 of the thermal gradient 302 is located at the particular portion of the exposed face 330. For example, as depicted in FIG. 9, the sun position 304 may correspond with position $S_1$ the instant the azimuth angle 342 of the sun intersects the particular portion of the exposed face 330 but may have advanced along the sun path (SP) to position $S_2$ by the time the maximal peak 318 of the thermal gradient 302 is established at the particular position. In other words, the azimuth offset 432 may reflect the degree to which the azimuth angle 434 of the location of the maximal peak 318 (thus the displacement direction 316) may lag (e.g., temporally lag) the azimuth angle 342 of the sun. It should also be appreciated that the azimuth offset 432 may vary with the latitude of the wind turbine 100, time of year, and/or time of day.

In an embodiment, the controller 200, may determine the circumferential position 436 of the maximal peak 318 of the thermal gradient 302. The determination of the circumferential position 436 may be based on azimuth offset 432. The circumferential position 436 of the maximal peak 318 may, for example as depicted in FIG. 9, be expressed in terms of degrees from east and/or a point of intersection of the sun with the horizon. However, the circumferential position 436 may also be expressed in other suitable terms such as degrees or radians from due north or a coordinate system defined by the tower 102.

In so far as the azimuth offset 432 may be influenced by the time required for the temperature of the portion of the exposed face 330 to rise in response to the solar heating, the azimuth offset 432 may be impacted by a thermal property of the tower 102. Accordingly, the controller 200 may, in an embodiment, receive an indication of the thermal property of a tower material (e.g., a material of the tower wall 103). The controller 200 may then determine the azimuth offset 432 for the thermal gradient 302 based, at least in part, on the thermal property of the tower material. For example, in an embodiment wherein the thermal properties of tower material facilitate a rapid rise in temperature when subjected to solar heating, the azimuth offset 432 may be smaller than for a tower material that resists temperature change.

Referring still to FIGS. 4-11, in an embodiment, the controller 200 of the system 300 may be configured to determine the correction factor 320. The correction factor 320 may be configured to mitigate an impact of the displacement 306 on an operation (e.g., at least one control setpoint) of the wind turbine 100. Accordingly, the controller 200 may, in an embodiment implementing the process 500, receive a plurality of historical positional observations 502 of the sun at a plurality of sampling intervals 418. As depicted at 504, the controller 200 may determine the thermal gradient 302 of the tower 102 at each of the historical positional observations 502. The determination of the thermal gradient 302 of the tower 102 at each of the historical positional observations 502 may, for example, be based on temperature indications 402 (e.g. historical temperature indications 420) received from the plurality of thermal sensors 180.

The controller 200 may then determine a sun-gradient correlation 506. The sun-gradient correlation 506 may describe a relationship between the plurality of historical positional observations 502 and the location of the maximal peak 318 (e.g., the circumferential position 436) of the thermal gradient 302 at each of the historical positional observations 502. In other words, the controller 200 may utilize the historical data to determine that for a particular sun position 304 (e.g., azimuth angle 342 and elevation angle 430), the maximal peak 318 may have a particular circumferential position 436. As such, the sun-gradient correlation 506 may be a lookup table, a graphical representation, a computer-implemented function, and/or a combination thereof.

As depicted at 508, the controller 200 may utilize the sun-gradient correlation 506 to determine a current and/or projected location of the maximal peak 318. Specifically, the controller 200 may receive a current sun position 510 or a projected sun position 512 (e.g., current and/or projected azimuth angle 342 and elevation angle 430). In turn, the location of the maximal peak 318 of the thermal gradient 302 may be determined as indicated by the sun-gradient correlation 506 when the sun is in one of the current position 510 or the projected position 512.

As depicted at 514 of the process 500, the controller 200 may determine the displacement 306 of the reference point 308 based on the current sun position 510 and/or the projected sun position 512. The correction factor 320 may then be determined based, at least in part, on the displacement 306 of the reference point 308 for the current sun position 510 and/or the projected sun position 512. For example, in an embodiment, the current sun position 510 may be utilized by the controller 200 to determine the correction factor 320 in order to facilitate the real-time control of the wind turbine 100. In an additional embodiment, the controller 200 may utilize the projected sun position 512 to model a potential correction factor 320 for various future periods of operation, such as various time increments during daylight operations of the wind turbine 100 on a particular day.

Figure 7:
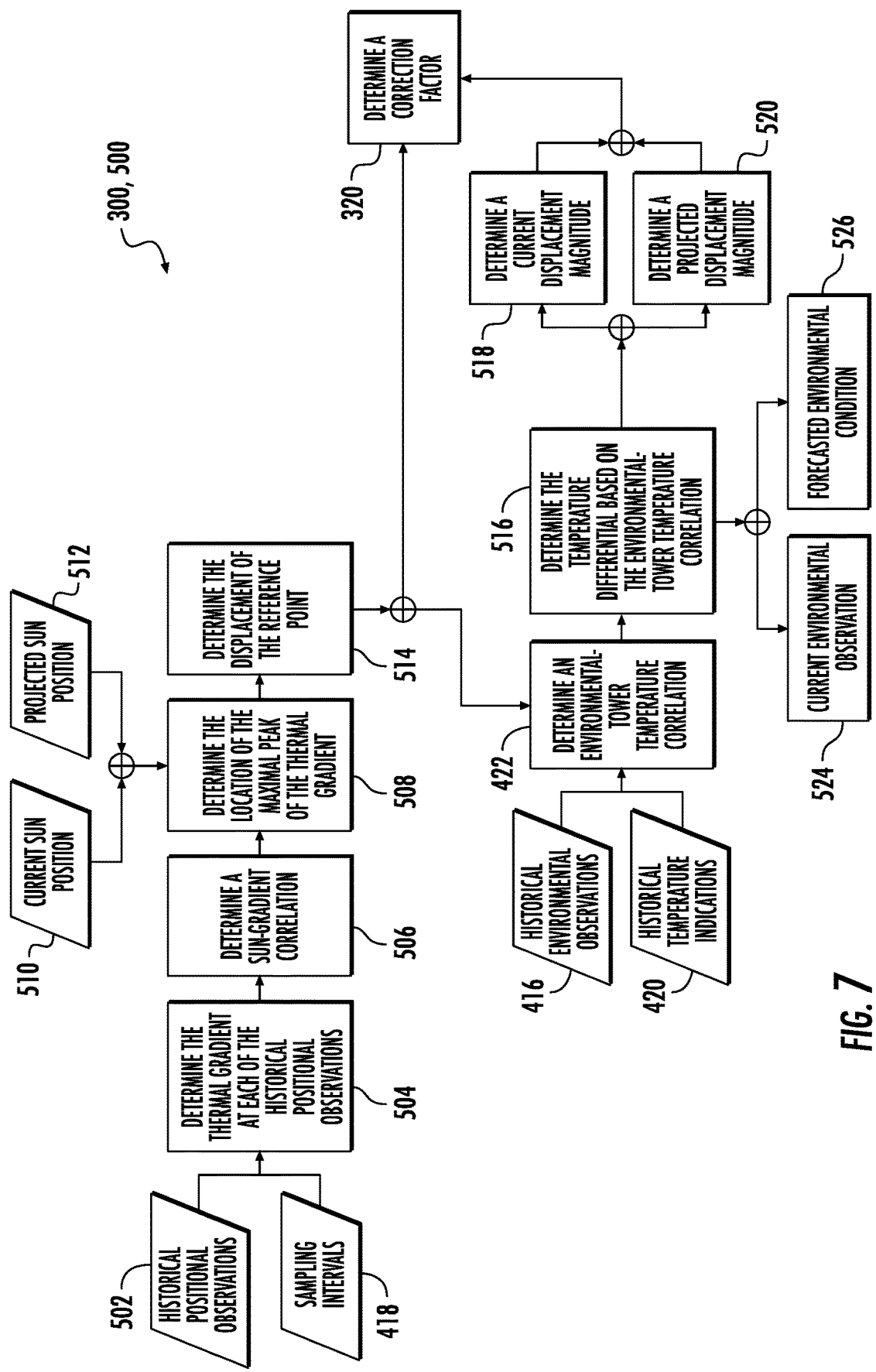
FIG. 7 illustrates a flow diagram of one embodiment of a portion of the control logic of FIG. 5 according to the present disclosure.
Figure 8:
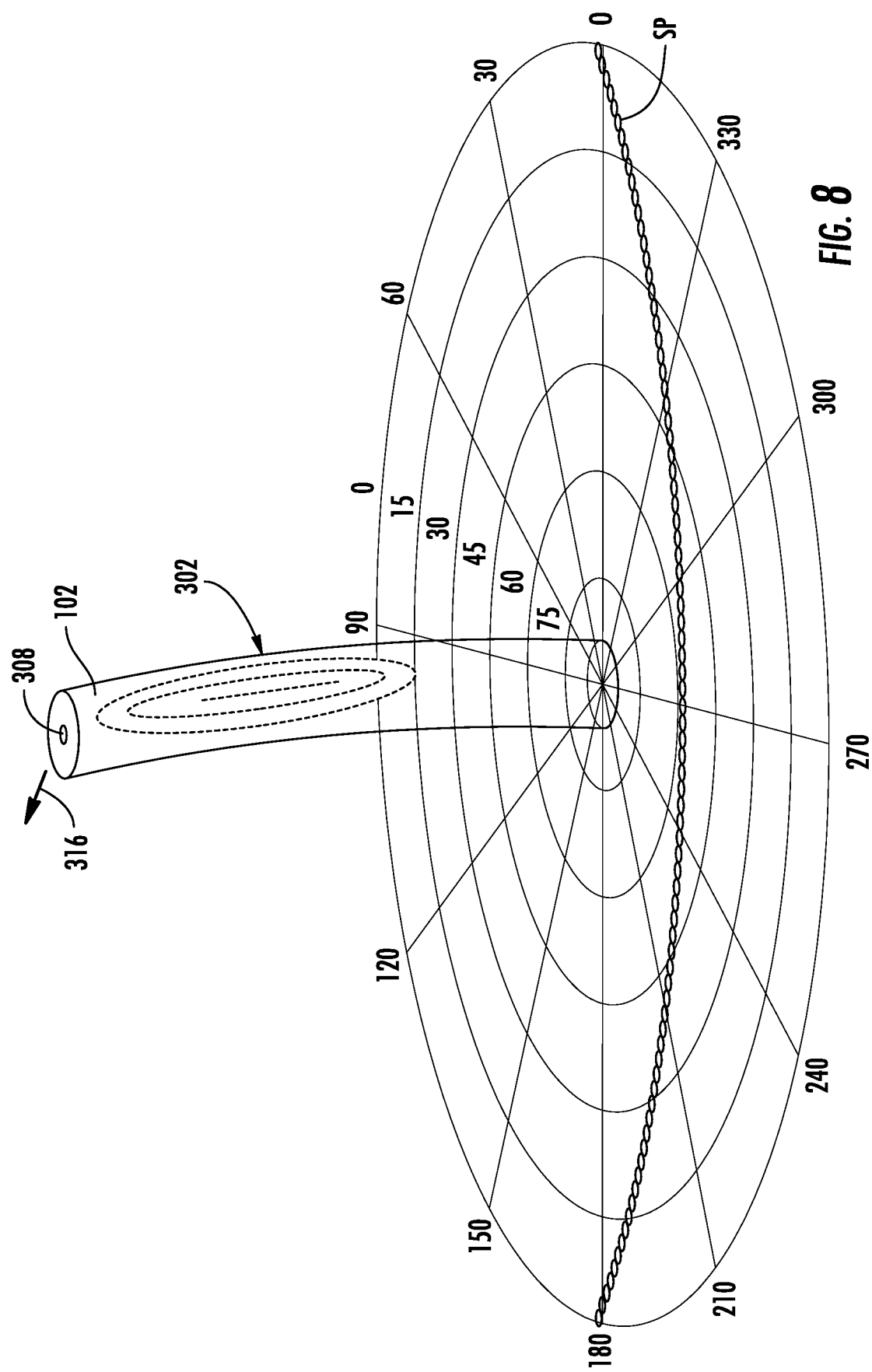
FIG. 8 illustrates a perspective view of a wind turbine tower subjected to solar heating according to the present disclosure.

As particularly depicted in FIG. 7, in an embodiment, determining the current and/or potential correction factor 320 corresponding to the current sun position 510 and/or the projected sun position 512 may be based, at least in part, on a current displacement magnitude 518 and/or a projected displacement magnitude 520. Accordingly, as more fully discussed above, the controller 200 may, in an embodiment, receive the plurality of historical environmental observations 416 at the plurality of sampling intervals 418. The controller 200 may then determine the environmental-tower temperature correlation 422 between the plurality of historical environmental observations 416 and the corresponding plurality of historical temperature indications 420 for the tower 102 at the plurality of sampling intervals 418.

As depicted at 516, the controller 200 may determine the temperature differential 326 (e.g., a current and/or projected temperature differential 326) based on the environmental-tower temperature correlation 422 and a current environmental observation 522 and/or a forecast environmental condition 526. The current environmental observation 522 may be at least a portion of the current environmental data 424, which may include an environmental observation at the current date and time received from the environmental sensor(s) 156.

Based on the temperature differential 326, the controller 200 may determine the current displacement magnitude 518 and/or the projected displacement magnitude 520 at the current environmental observation 524 and/or the forecast environmental condition 526. In other words, the controller 200 may determine the current and/or projected displacement magnitude 518, 520 resulting from the corresponding environmental condition. The correction factor 320 may then be determined and configured to mitigate the impact of the current/projected displacement magnitude 518, 520 on the operation of the wind turbine 100.

Figure 5:
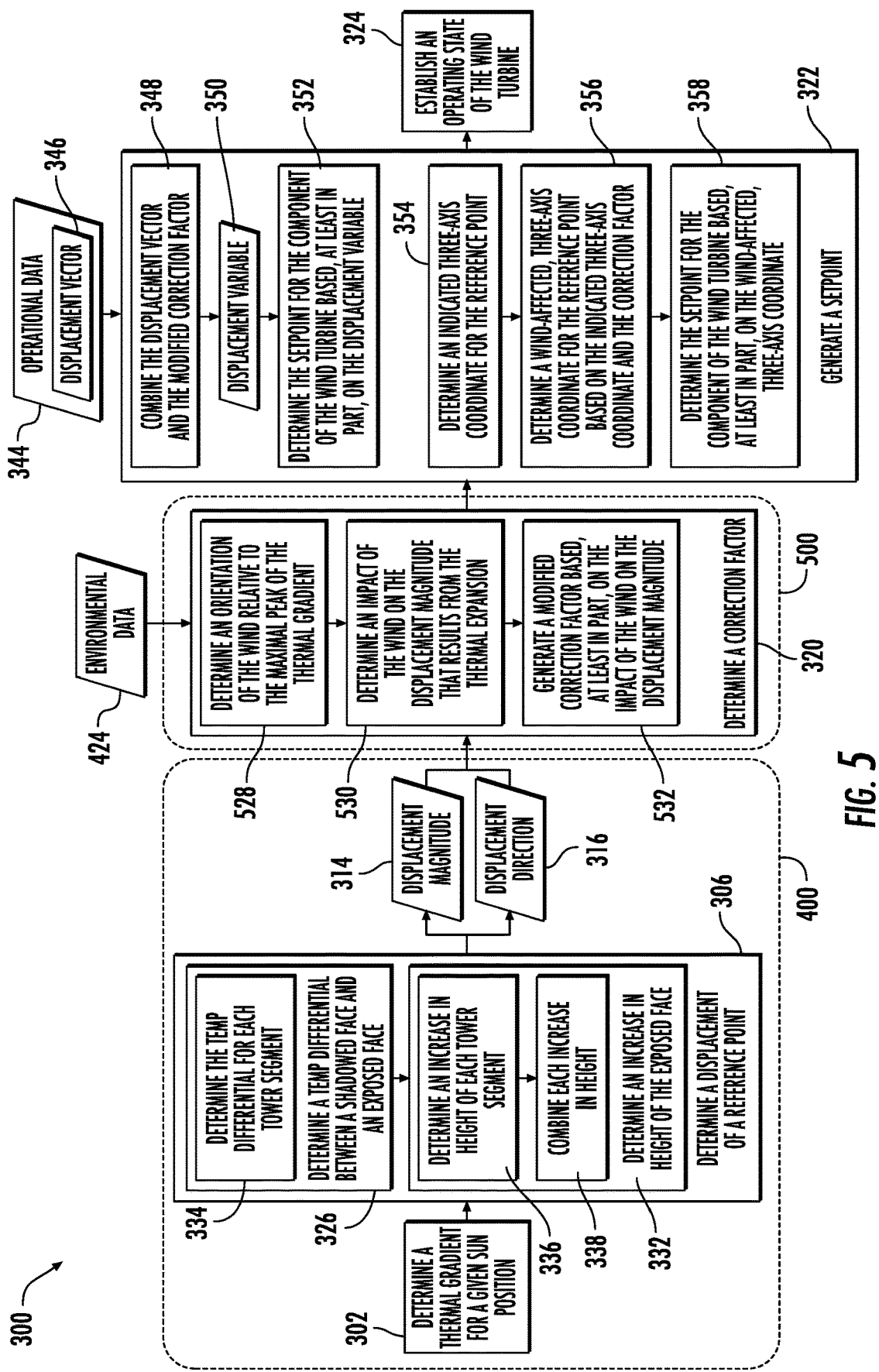
FIG. 5 illustrates a flow diagram of one embodiment of a control logic of a system for controlling a wind turbine according to the present disclosure.
Figure 6:
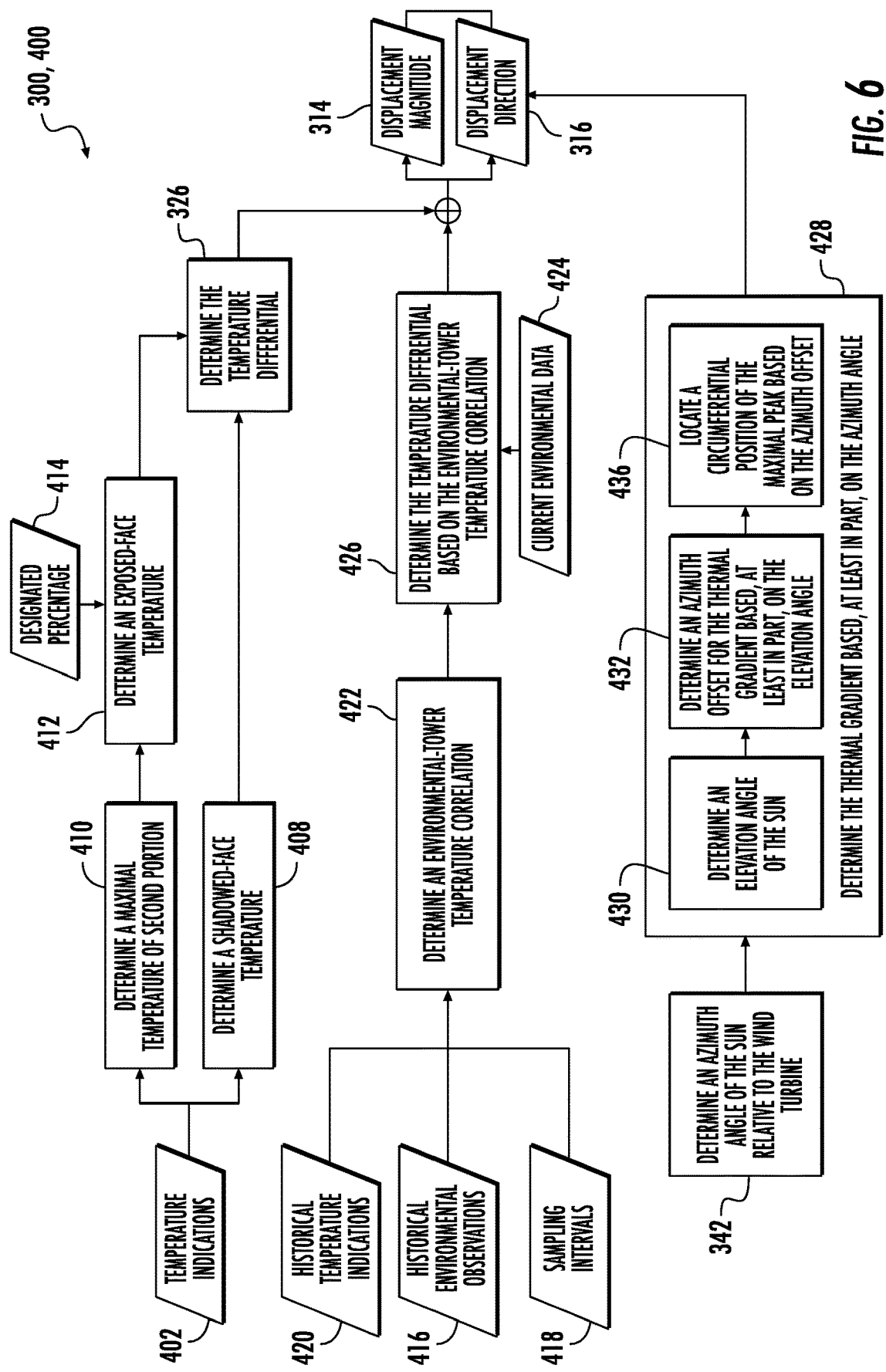
FIG. 6 illustrates a flow diagram of one embodiment of a portion of the control logic of FIG. 5 according to the present disclosure.

As particularly depicted in FIG. 5, in an embodiment, the controller 200 may be configured to receive environmental data 424 (e.g., a current environmental observation 524) descriptive of a wind affecting the wind turbine 100. The environmental data 424 may include a wind direction and a wind magnitude (e.g., a wind velocity). Based on the environmental data 424, the controller 200 may, as depicted at 528, determine an orientation of the wind relative to the location (e.g., the circumferential position 436) of the maximal peak 318 of the thermal gradient 302.

The controller 200 may, as depicted at 530, determine an impact of the wind on the displacement magnitude 316. Specifically, the controller 200 may, in an embodiment, determine an impact on displacement magnitude 316 of the displacement 306 of the reference point 308 resulting from the thermal expansion. In other words, the controller 200 may, for example, determine whether the wind direction and magnitude result in an increase or decrease of the displacement magnitude 316 relative to such displacement magnitude 316 as may be attributable solely to the thermal expansion.

Following the determination of the impact of the wind on the displacement magnitude 316, the controller 200 may, in an embodiment, generate a modified correction factor 532. The modified correction factor 532 may mitigate/eliminate the impact of the wind on the displacement magnitude 316 such that the true value of the displacement magnitude 314 attributable to thermal expansion may, therefore, be corrected for by the system 300.

In order to generate the setpoint 322, the controller 200 may, in an embodiment, receive operational data 344, such as from the operational sensor(s) 158. The operational data 344 may be indicative of a displacement vector 346 of the reference point 308. The displacement vector 346 may include magnitude and direction components that may be attributable to thermal expansion due to solar heating, the wind affecting the wind turbine 100, operations of the wind turbine 100 and/or combinations thereof. As such, the displacement vector 346 may represent an apparent displacement of the reference point 308. For example, in an embodiment, the displacement vector 346 may correspond to positional data and/or acceleration data received from the operational sensor(s) 158.

As depicted at 348, the controller 200 may, in an embodiment, combine the displacement vector 346 and the modified correction factor 532 to generate a displacement variable 350. The displacement variable 350 may be indicative of a response of the tower 102 to a factor other than solar heating. For example, the displacement variable 350 may be indicative of a response of the wind turbine 100 to the wind. In other words, by applying the modified correction factor 532 to the displacement vector 346 the impact of solar heating on the perceived displacement of the reference point 308 may be mitigated/eliminated and the modified displacement vector 346 may then be indicative of a response of the wind turbine 100 to the prevailing wind.

It should be appreciated that, in an embodiment, the displacement variable 350 may be a control input upon which control of the wind turbine 100 may, at least in part, be based in order to establish the wind turbine 100 at an optimal setpoint for the prevailing wind/grid conditions. Accordingly, as depicted at 352, in an embodiment, the controller 200 may determine the setpoint 322 for the component 160 of the wind turbine 100 based, at least in part, on the displacement variable. In other words, the utilization of the displacement variable 350 may facilitate control decisions based on the displacement of the reference point 308 without the control decision being impacted by the displacement magnitude 314 due to solar heating.

Referring still in particular to FIG. 5, in an embodiment, in order to generate the setpoint 322 for the component 160, the controller 200 may determine an indicated three-axis coordinate 354 for the reference point 308. The three-axis coordinate 354 may, for example, correspond to positional data received from the operational sensor(s) 158. The indicated three-axis coordinate 354 may represent a displaced position of the reference point 308 in response to solar heating, the wind, and/or an operation of the wind turbine 100.

It should be appreciated that the indicated three-axis coordinate 354 may not accurately reflect a degree of deviation of an operation of the wind turbine 100 from an optimal setpoint for the given wind conditions. For example, insofar as the indicated three-axis coordinate 354 may include the displacement magnitude 316 resulting from solar heating and the displacement magnitude resulting from the wind (or an operation in response thereto), the indicated three-axis coordinate 354 may correspond to a thrust level on the wind turbine 100 that is different than the thrust truly exerted on the wind turbine 100. Thus, controlling the wind turbine 100 based on the indicated three-axis coordinate 354 may, for example, result in generating less power than would otherwise be possible for the given wind conditions or potentially overloading a component 160 of the wind turbine 100.

In light of the above, in order to facilitate control of the wind turbine 100 in response to the prevailing wind, the controller 200 may, in an embodiment, determine a wind-affected, three-axis coordinate 356 for the reference point 308. The wind-affected, three-axis coordinate 356 may be based on the indicated three-axis coordinate 354 and the correction factor 320. As such, the wind-affected, three-axis coordinate 356 may be indicative of a displacement of the reference point 308 due to the wind and/or an operation of the wind turbine 100 in response to the wind in the absence of the displacement magnitude 314 attributable to solar heating. In other words, the wind-affected, three-axis coordinate 356 may indicate the displacement of the wind turbine 100 to be utilized as a control input for establishing the wind turbine 100 at an optimal setpoint for the given wind conditions. Accordingly, as depicted at 358, the controller 200 may determine the setpoint 322 for the component 160 of the wind turbine 100 based, at least in part, on the wind-affected, three-axis coordinate 356.

Figure 12:
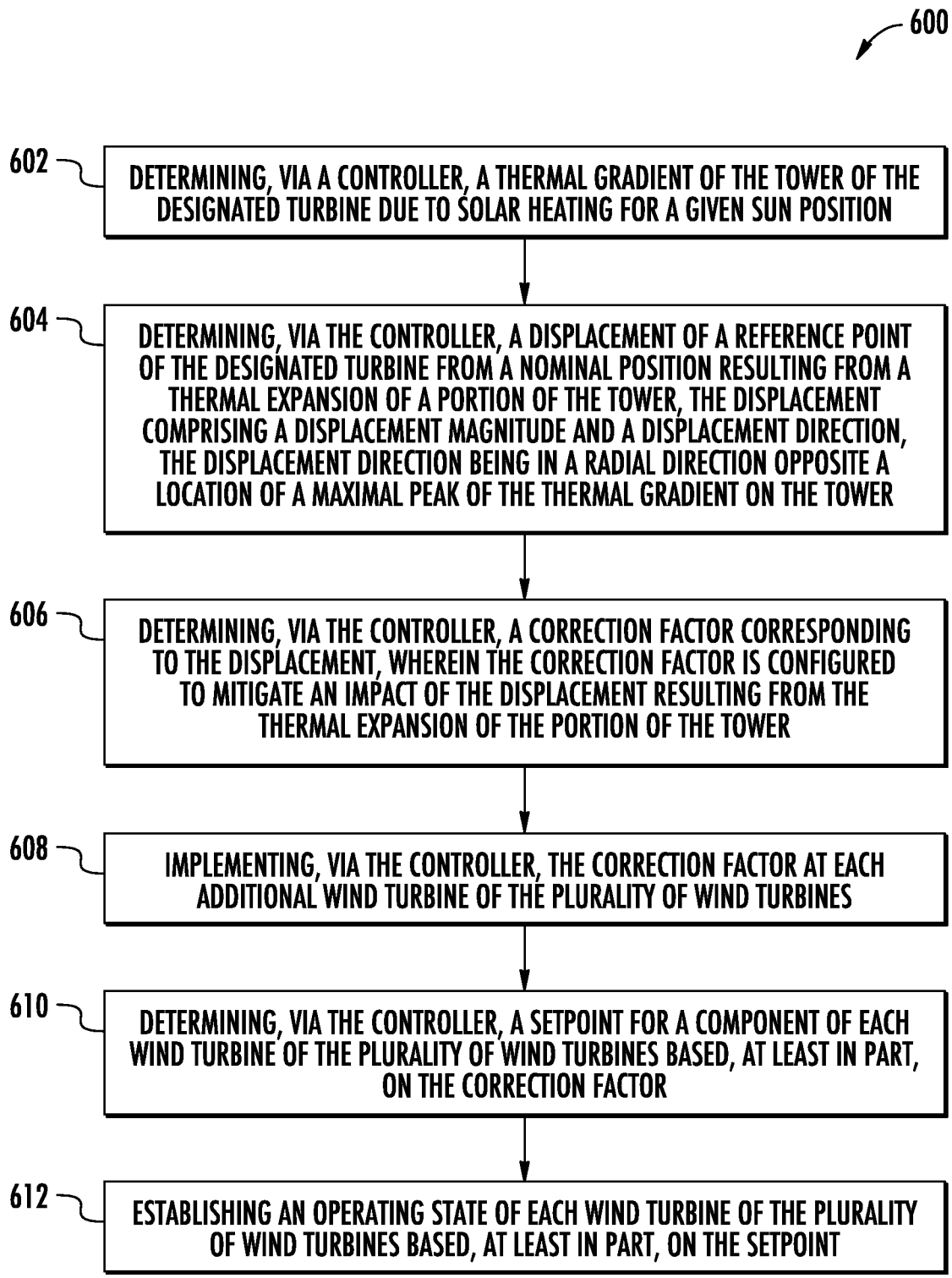
FIG. 12 illustrates a flow chart of one embodiment of a method for controlling a plurality of wind turbines of a wind farm.

Referring to FIG. 12, a flow diagram of one embodiment of a method 600 for controlling a plurality of wind turbines 162 of the wind farm 152 is illustrated. The plurality of wind turbines 162 may include a designated turbine 174 having the nacelle 106 mounted atop the tower 102. The method 600 may be implemented using, for instance, the system 300 discussed above with reference to FIGS. 4-11. FIG. 12 depicts steps performed in a particular order for purposes of illustration and discussion. Those of ordinary skill in the art, using the disclosures provided herein, will understand that various steps of the method 600 or any of the other methods disclosed herein may be adapted, modified, rearranged, performed simultaneously or modified in various ways without deviating from the scope of the present disclosure.

As shown at (602), the method 600 may include determining, via a controller, a thermal gradient of the tower of the designated turbine due to solar heating for a given sun position. As shown at (604), the method 600 may include determining, via the controller, a displacement of a reference point of the designated turbine from a nominal position resulting from a thermal expansion of a portion of the tower. The displacement may include a displacement magnitude and a displacement direction. The displacement direction may be in a radial direction opposite a location of a maximal peak of the thermal gradient on the tower. As shown at (606), the method 600 may include determining, via the controller, a correction factor corresponding to the displacement. The correction factor may be configured to mitigate an impact of the displacement resulting from the thermal expansion of the portion of the tower. Additionally, as shown at (608), the method 600 may include implementing, via the controller, the correction factor at each additional wind turbine of the plurality of wind turbines. Also, as shown at (610), the method 600 may include determining, via the controller, a setpoint for a component of each wind turbine of the plurality of wind turbines based, at least in part, on the correction factor. Further, as shown at (612), the method 600 may include establishing an operating state of each wind turbine of the plurality of wind turbines based, at least in part, on the setpoint.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method for controlling a wind turbine, the wind turbine having a nacelle mounted atop a tower, the method comprising: determining, via a controller, a thermal gradient of the tower due to solar heating for a given sun position; determining, via the controller, a displacement of a reference point of the wind turbine from a nominal position resulting from a thermal expansion of a portion of the tower, the displacement comprising a displacement magnitude and a displacement direction, the displacement direction being in a radial direction opposite a location of a maximal peak of the thermal gradient on the tower; determining, via the controller, a correction factor corresponding to the displacement, wherein the correction factor is configured to mitigate an impact of the displacement resulting from the thermal expansion of the portion of the tower; generating, via the controller, a setpoint for a component of the wind turbine based, at least in part, on the correction factor; and establishing an operating state of the wind turbine based, at least in part, on the setpoint.

Clause 2. The method of clause 1, wherein determining the displacement of the reference point further comprises: determining, via the controller, a temperature differential between a shadowed face of the tower and an exposed face of the tower as indicated by the thermal gradient; and determining, via the controller, an increase in a height of the exposed face based on a coefficient of thermal expansion of a tower material and the temperature differential, wherein the displacement magnitude is based, at least in part, on the increase in the height.

Clause 3. The method of any preceding clause, wherein the tower comprises a plurality of vertically arranged tower segments, and wherein determining the increase in the height of the exposed face further comprises: determining, via the controller, the temperature differential for each tower segment of the plurality of tower segments; determining, via the controller, an increase in the height of an exposed face of each tower segment of the plurality of tower segments; and combining, via the controller, the increase in height of the exposed face of each tower segment of the plurality of tower segments to determine the increase in height of the exposed face.

Clause 4. The method of any preceding clause, wherein the wind turbine further comprises a plurality of temperature sensors distributed circumferentially about a vertical axis of the wind turbine and operationally coupled to the tower, and wherein determining the thermal gradient further comprises: receiving, via the controller, a plurality of temperature indications from the plurality of temperature sensors, wherein the plurality of temperature indications correspond to a tower temperature at each temperature sensor location.

Clause 5. The method of any preceding clause, wherein a first portion of the plurality of temperature sensors are operably coupled to the shadowed face and a second portion of the plurality of temperature sensors are operably coupled to the exposed face, and wherein determining the temperature differential further comprises: determining, via the controller, a shadowed-face temperature based on an average of the temperature indications from each temperature sensor of the first portion of the plurality of temperature sensors at a given instant; determining, via the controller, a maximal temperature indication of the second portion of the plurality of temperature sensors at the given instant; determining, via the controller, an exposed-face temperature based, at least in part, on the maximal temperature indication, wherein the exposed-face temperature corresponds to a designated percentage of the maximal temperature indication such that the exposed-face temperature is less than or equal to the maximal temperature indication; and subtracting, via the controller, the shadowed-face temperature from the exposed-face temperature to determine the temperature differential between the shadowed face of the tower and the exposed face of the tower.

Clause 6. The method of any preceding clause, wherein determining the thermal gradient further comprises: determining, via the controller, the thermal gradient as a circumferential thermal gradient based on the plurality of temperature indications from the plurality of temperature sensors.

Clause 7. The method of any preceding clause, wherein determining the temperature differential further comprises: receiving, via the controller, a plurality of historical environmental observations at a plurality of sampling intervals, wherein the plurality of sampling intervals are indicative of a date and a time of day; determining, via the controller, an environmental-tower temperature correlation of the plurality of historical environmental observations to a plurality of historical temperature indications for the tower at the plurality of sampling intervals; and determining, via the controller, the temperature differential based on the environmental-tower temperature correlation and an environmental observation at a current date and time.

Clause 8. The method of any preceding clause, wherein determining the displacement direction further comprises: determining, via the controller, an azimuth angle of the sun relative to the wind turbine for the given sun position; and determining, via the controller, the thermal gradient based, at least in part, on the azimuth angle of the sun.

Clause 9. The method of any preceding clause, wherein determining the thermal gradient further comprises: determining an elevation angle of the sun above a horizon relative to the wind turbine for the given sun position; determining, via the controller, an azimuth offset for the thermal gradient based, at least in part, on the elevation angle, wherein the azimuth offset corresponds to an angular difference between the azimuth angle of the sun and an azimuth angle of the location of the maximal peak of the thermal gradient on the tower; and locating, via the controller, a circumferential position of the maximal peak of the thermal gradient based on the azimuth offset.

Clause 10. The method of any preceding clause, wherein determining the azimuth offset further comprises: receiving, via the controller, an indication of a thermal property of a tower material; and determining, via the controller, the azimuth offset for the thermal gradient based, at least in part, on the thermal property of the tower material.

Clause 11. The method of any preceding clause, wherein determining the correction factor further comprises: receiving, via the controller, a plurality of historical positional observations of the sun at a plurality of sampling intervals; determining, via the controller, the thermal gradient of the tower at each of the historical positional observations; determining, via the controller, a sun-gradient correlation between the plurality of historical positional observations and the location of the maximal peak of the thermal gradient on the tower at each of the historical positional observations; determining, via the controller, the location of the maximal peak of the thermal gradient as indicated by the sun-gradient correlation when the sun is in one of a current position or a projected position; determining, via the controller, the displacement of the reference point based on one of the current sun position or the projected sun position; and determining, via the controller, the correction factor based, at least in part, on the displacement of the reference point for one of the current sun position or the projected sun position.

Clause 12. The method of any preceding clause, wherein determining the correction factor further comprises: receiving, via the controller, a plurality of historical environmental observations at the plurality of sampling intervals; determining, via the controller, an environmental-tower temperature correlation between the plurality of historical environmental observations and a corresponding plurality of historical temperature indications for the tower at the plurality of sampling intervals; determining, via the controller, the temperature differential based on the environmental-tower temperature correlation and one of a current environmental observation or a forecasted environmental condition; determining, via the controller, one of a current displacement magnitude or a projected displacement magnitude based on the temperature differential at one of the current environmental observation or the forecasted environmental condition; and determining, via the controller, the correction factor based, at least in part, on one of the current displacement magnitude or the projected displacement magnitude.

Clause 13. The method of any preceding clause, wherein generating the setpoint for the component of the wind turbine further comprises: receiving, via the controller, environmental data descriptive of a wind affecting the wind turbine, wherein the environmental data includes a wind direction and a wind magnitude; determining, via the controller, an orientation of the wind relative to the maximal peak of the thermal gradient; determining, via the controller, an impact of the wind on the displacement magnitude of the displacement of the reference point resulting from the thermal expansion; generating, via the controller, a modified correction factor based, at least in part, on the impact of the wind on the displacement magnitude; receiving, via the controller, operational data indicative of a displacement vector of the reference point; combining, via the controller, the displacement vector and the modified correction factor to generate a displacement variable, wherein the displacement variable is indicative of a response of the wind turbine to the wind; and determining, via the controller, the setpoint for the component of the wind turbine based, at least in part, on the displacement variable.

Clause 14. The method of any preceding clause, wherein generating the setpoint for the component of the wind turbine further comprises: determining, via the controller, an indicated three-axis coordinate for the reference point; determining, via the controller, a wind-affected, three-axis coordinate for the reference point based on the indicated three-axis coordinate and the correction factor; and determining, via the controller, the setpoint for the component of the wind turbine based, at least in part, on the wind-affected, three-axis coordinate.

Clause 15. A method for controlling a plurality of wind turbines of a wind farm, the plurality of wind turbines comprising a designated turbine having a nacelle mounted atop a tower, the method comprising: determining, via a controller, a thermal gradient of the tower of the designated turbine due to solar heating for a given sun position; determining, via the controller, a displacement of a reference point of the designated turbine from a nominal position resulting from a thermal expansion of a portion of the tower, the displacement comprising a displacement magnitude and a displacement direction, the displacement direction being in a radial direction opposite a location of a maximal peak of the thermal gradient on the tower; determining, via the controller, a correction factor corresponding to the displacement, wherein the correction factor is configured to mitigate an impact of the displacement resulting from the thermal expansion of the portion of the tower; implementing, via the controller, the correction factor at each additional wind turbine of the plurality of wind turbines; determining, via the controller, a setpoint for a component of each wind turbine of the plurality of wind turbines based, at least in part, on the correction factor; and establishing an operating state of each wind turbine of the plurality of wind turbines based, at least in part, on the setpoint.

Clause 16. The method of any preceding clause, wherein the tower of the designated turbine comprises a plurality of vertically arranged tower segments, wherein determining the displacement of the reference point further comprises: determining, via the controller, a temperature differential between a shadowed face of the tower and an exposed face of the tower as indicated by the thermal gradient; determining, via the controller, the temperature differential for each tower segment of the plurality of tower segments; determining, via the controller, an increase in a height of an exposed face of each tower segment of the plurality of tower segments based on a coefficient of thermal expansion of a tower material and the temperature differential; and combining, via the controller, the increase in height of the exposed face of each tower segment of the plurality of tower segments to determine an increase in height of the exposed face, wherein the displacement magnitude is based, at least in part, on the increase in the height.

Clause 17. The method of any preceding clause, wherein determining the displacement direction further comprises: determining, via the controller, an azimuth angle of the sun relative to the designated turbine for the given sun position; determining an elevation angle of the sun above a horizon relative to the designated turbine for the given sun position; receiving, via the controller, an indication of a thermal property of a tower material; determining, via the controller, an azimuth offset for the thermal gradient based, at least in part, on the elevation angle and the thermal property, the azimuth offset corresponding to an angular difference between the azimuth angle of the sun and an azimuth angle of the location of the maximal peak of the thermal gradient on the tower; and locating, via the controller, a circumferential position of the maximal peak of the thermal gradient based on the azimuth offset.

Clause 18. A system for controlling a wind turbine, the system comprising: a tower comprising a plurality of vertically arranged tower segments; a nacelle mounted atop the tower; and a controller, the controller comprising at least one processor configured to perform a plurality of operations, the plurality of operations comprising: determining a thermal gradient of the tower due to solar heating for a given sun position, determining a displacement of a reference point of the wind turbine from a nominal position resulting from a thermal expansion of a portion of the tower, the displacement comprising a displacement magnitude and a displacement direction, the displacement direction being in a radial direction opposite a location of a maximal peak of the thermal gradient on the tower, determining a correction factor corresponding to the displacement, wherein the correction factor is configured to mitigate an impact of the displacement resulting from the thermal expansion of the portion of the tower, generating a setpoint for a component of the wind turbine based, at least in part, on the correction factor, and establishing an operating state of the wind turbine based, at least in part, on the setpoint.

Clause 19. The system of any preceding clause, wherein determining the displacement of the reference point further comprises: determining a temperature differential between a shadowed face of the tower and an exposed face of the tower as indicated by the thermal gradient; and determining the temperature differential for each tower segment of the plurality of tower segments; determining an increase in a height of an exposed face of each tower segment of the plurality of tower segments based on a coefficient of thermal expansion of a tower material and the temperature differential; and combining the increase in height of the exposed face of each tower segment of the plurality of tower segments to determine an increase in height of the exposed face, wherein the displacement magnitude is based, at least in part, on the increase in the height.

Clause 20. The system of any preceding clause, wherein determining the displacement direction further comprises: determining an azimuth angle of the sun relative to the wind turbine for the given sun position; determining an elevation angle of the sun above a horizon relative to the wind turbine for the given sun position; receiving an indication of a thermal property of a tower material; determining an azimuth offset for the thermal gradient based, at least in part, on the elevation angle, wherein the azimuth offset corresponds to an angular difference between the azimuth angle of the sun and an azimuth angle of the location of the maximal peak of the thermal gradient on the tower; and locating a circumferential position of the maximal peak of the thermal gradient based on the azimuth offset.

What is claimed is:

1. A method for controlling a wind turbine, the wind turbine having a nacelle mounted atop a tower, the method comprising:
    determining, via a controller, a thermal gradient of the tower due to solar heating for a given sun position;
    determining, via the controller, a displacement of a reference point of the wind turbine from a nominal position resulting from a thermal expansion of a portion of the tower, the displacement comprising a displacement magnitude and a displacement direction, the displacement direction being in a radial direction opposite a location of a maximal peak of the thermal gradient on the tower;
    determining, via the controller, a correction factor corresponding to the displacement, wherein the correction factor is configured to mitigate an impact of the displacement resulting from the thermal expansion of the portion of the tower;

generating, via the controller, a setpoint for a component of the wind turbine based, at least in part, on the correction factor; and establishing an operating state of the wind turbine based, at least in part, on the setpoint.

2. The method of claim 1, wherein determining the displacement of the reference point further comprises:

determining, via the controller, a temperature differential between a shadowed face of the tower and an exposed face of the tower as indicated by the thermal gradient; and determining, via the controller, an increase in a height of the exposed face based on a coefficient of thermal expansion of a tower material and the temperature differential, wherein the displacement magnitude is based, at least in part, on the increase in the height.

3. The method of claim 2, wherein the tower comprises a plurality of vertically arranged tower segments, and wherein determining the increase in the height of the exposed face further comprises:

determining, via the controller, the temperature differential for each tower segment of the plurality of tower segments;

determining, via the controller, an increase in the height of an exposed face of each tower segment of the plurality of tower segments; and combining, via the controller, the increase in height of the exposed face of each tower segment of the plurality of tower segments to determine the increase in height of the exposed face.

4. The method of claim 2, wherein the wind turbine further comprises a plurality of temperature sensors distributed circumferentially about a vertical axis of the wind turbine and operationally coupled to the tower, and wherein determining the thermal gradient further comprises:

receiving, via the controller, a plurality of temperature indications from the plurality of temperature sensors, wherein the plurality of temperature indications correspond to a tower temperature at each temperature sensor location.

5. The method of claim 4, wherein a first portion of the plurality of temperature sensors are operably coupled to the shadowed face and a second portion of the plurality of temperature sensors are operably coupled to the exposed face, and wherein determining the temperature differential further comprises:

determining, via the controller, a shadowed-face temperature based on an average of the temperature indications from each temperature sensor of the first portion of the plurality of temperature sensors at a given instant;

determining, via the controller, a maximal temperature indication of the second portion of the plurality of temperature sensors at the given instant;

determining, via the controller, an exposed-face temperature based, at least in part, on the maximal temperature indication, wherein the exposed-face temperature corresponds to a designated percentage of the maximal temperature indication such that the exposed-face temperature is less than or equal to the maximal temperature indication; and subtracting, via the controller, the shadowed-face temperature from the exposed-face temperature to determine the temperature differential between the shadowed face of the tower and the exposed face of the tower.

6. The method of claim 4, wherein determining the thermal gradient further comprises:

determining, via the controller, the thermal gradient as a circumferential thermal gradient based on the plurality of temperature indications from the plurality of temperature sensors.

7. The method of claim 2, wherein determining the temperature differential further comprises:

receiving, via the controller, a plurality of historical environmental observations at a plurality of sampling intervals, wherein the plurality of sampling intervals are indicative of a date and a time of day;

determining, via the controller, an environmental-tower temperature correlation of the plurality of historical environmental observations to a plurality of historical temperature indications for the tower at the plurality of sampling intervals; and determining, via the controller, the temperature differential based on the environmental-tower temperature correlation and an environmental observation at a current date and time.

8. The method of claim 2, wherein determining the displacement direction further comprises:

determining, via the controller, an azimuth angle of the sun relative to the wind turbine for the given sun position; and determining, via the controller, the thermal gradient based, at least in part, on the azimuth angle of the sun.

9. The method of claim 8, wherein determining the thermal gradient further comprises:

determining an elevation angle of the sun above a horizon relative to the wind turbine for the given sun position;

determining, via the controller, an azimuth offset for the thermal gradient based, at least in part, on the elevation angle, wherein the azimuth offset corresponds to an angular difference between the azimuth angle of the sun and an azimuth angle of the location of the maximal peak of the thermal gradient on the tower; and locating, via the controller, a circumferential position of the maximal peak of the thermal gradient based on the azimuth offset.

10. The method of claim 9, wherein determining the azimuth offset further comprises:

receiving, via the controller, an indication of a thermal property of a tower material; and determining, via the controller, the azimuth offset for the thermal gradient based, at least in part, on the thermal property of the tower material.

11. The method of claim 4, wherein determining the correction factor further comprises:

receiving, via the controller, a plurality of historical positional observations of the sun at a plurality of sampling intervals;

determining, via the controller, the thermal gradient of the tower at each of the historical positional observations;

determining, via the controller, a sun-gradient correlation between the plurality of historical positional observations and the location of the maximal peak of the thermal gradient on the tower at each of the historical positional observations;

determining, via the controller, the location of the maximal peak of the thermal gradient as indicated by the sun-gradient correlation when the sun is in one of a current position or a projected position;

determining, via the controller, the displacement of the reference point based on one of the current sun position or the projected sun position; and determining, via the controller, the correction factor based, at least in part, on the displacement of the reference point for one of the current sun position or the projected sun position.

12. The method of claim 11, wherein determining the correction factor further comprises:

receiving, via the controller, a plurality of historical environmental observations at the plurality of sampling intervals;

determining, via the controller, an environmental-tower temperature correlation between the plurality of historical environmental observations and a corresponding plurality of historical temperature indications for the tower at the plurality of sampling intervals;

determining, via the controller, the temperature differential based on the environmental-tower temperature correlation and one of a current environmental observation or a forecasted environmental condition;

determining, via the controller, one of a current displacement magnitude or a projected displacement magnitude based on the temperature differential at one of the current environmental observation or the forecasted environmental condition; and determining, via the controller, the correction factor based, at least in part, on one of the current displacement magnitude or the projected displacement magnitude.

13. The method of claim 1, wherein generating the setpoint for the component of the wind turbine further comprises:

receiving, via the controller, environmental data descriptive of a wind affecting the wind turbine, wherein the environmental data includes a wind direction and a wind magnitude;

determining, via the controller, an orientation of the wind relative to the maximal peak of the thermal gradient;

determining, via the controller, an impact of the wind on the displacement magnitude of the displacement of the reference point resulting from the thermal expansion;

generating, via the controller, a modified correction factor based, at least in part, on the impact of the wind on the displacement magnitude;

receiving, via the controller, operational data indicative of a displacement vector of the reference point;

combining, via the controller, the displacement vector and the modified correction factor to generate a displacement variable, wherein the displacement variable is indicative of a response of the wind turbine to the wind; and determining, via the controller, the setpoint for the component of the wind turbine based, at least in part, on the displacement variable.

14. The method of claim 1, wherein generating the setpoint for the component of the wind turbine further comprises:

determining, via the controller, an indicated three-axis coordinate for the reference point;

determining, via the controller, a wind-affected, three-axis coordinate for the reference point based on the indicated three-axis coordinate and the correction factor; and determining, via the controller, the setpoint for the component of the wind turbine based, at least in part, on the wind-affected, three-axis coordinate.

15. A method for controlling a plurality of wind turbines of a wind farm, the plurality of wind turbines comprising a designated turbine having a nacelle mounted atop a tower, the method comprising:

determining, via a controller, a thermal gradient of the tower of the designated turbine due to solar heating for a given sun position;

determining, via the controller, a displacement of a reference point of the designated turbine from a nominal position resulting from a thermal expansion of a portion of the tower, the displacement comprising a displacement magnitude and a displacement direction, the displacement direction being in a radial direction opposite a location of a maximal peak of the thermal gradient on the tower;

determining, via the controller, a correction factor corresponding to the displacement, wherein the correction factor is configured to mitigate an impact of the displacement resulting from the thermal expansion of the portion of the tower;

implementing, via the controller, the correction factor at each additional wind turbine of the plurality of wind turbines;

determining, via the controller, a setpoint for a component of each wind turbine of the plurality of wind turbines based, at least in part, on the correction factor; and establishing an operating state of each wind turbine of the plurality of wind turbines based, at least in part, on the setpoint.

16. The method of claim 15, wherein the tower of the designated turbine comprises a plurality of vertically arranged tower segments, wherein determining the displacement of the reference point further comprises:

determining, via the controller, a temperature differential between a shadowed face of the tower and an exposed face of the tower as indicated by the thermal gradient;

determining, via the controller, the temperature differential for each tower segment of the plurality of tower segments;

determining, via the controller, an increase in a height of an exposed face of each tower segment of the plurality of tower segments based on a coefficient of thermal expansion of a tower material and the temperature differential; and combining, via the controller, the increase in height of the exposed face of each tower segment of the plurality of tower segments to determine an increase in height of the exposed face, wherein the displacement magnitude is based, at least in part, on the increase in the height.

17. The method of claim 16, wherein determining the displacement direction further comprises:

determining, via the controller, an azimuth angle of the sun relative to the designated turbine for the given sun position;

determining an elevation angle of the sun above a horizon relative to the designated turbine for the given sun position;

receiving, via the controller, an indication of a thermal property of a tower material;

determining, via the controller, an azimuth offset for the thermal gradient based, at least in part, on the elevation angle and the thermal property, the azimuth offset corresponding to an angular difference between the azimuth angle of the sun and an azimuth angle of the location of the maximal peak of the thermal gradient on the tower; and locating, via the controller, a circumferential position of the maximal peak of the thermal gradient based on the azimuth offset.

18. A system for controlling a wind turbine, the system comprising:
   a tower comprising a plurality of vertically arranged tower segments;
   a nacelle mounted atop the tower; and
   a controller, the controller comprising at least one processor configured to perform a plurality of operations, the plurality of operations comprising:
      determining a thermal gradient of the tower due to solar heating for a given sun position,
      determining a displacement of a reference point of the wind turbine from a nominal position resulting from a thermal expansion of a portion of the tower, the displacement comprising a displacement magnitude and a displacement direction, the displacement direction being in a radial direction opposite a location of a maximal peak of the thermal gradient on the tower,
      determining a correction factor corresponding to the displacement, wherein the correction factor is configured to mitigate an impact of the displacement resulting from the thermal expansion of the portion of the tower,
      generating a setpoint for a component of the wind turbine based, at least in part, on the correction factor, and
      establishing an operating state of the wind turbine based, at least in part, on the setpoint.

19. The system of claim 18, wherein determining the displacement of the reference point further comprises:
   determining a temperature differential between a shadowed face of the tower and an exposed face of the tower as indicated by the thermal gradient; and
   determining the temperature differential for each tower segment of the plurality of tower segments;
   determining an increase in a height of an exposed face of each tower segment of the plurality of tower segments based on a coefficient of thermal expansion of a tower material and the temperature differential; and
   combining the increase in height of the exposed face of each tower segment of the plurality of tower segments to determine an increase in height of the exposed face, wherein the displacement magnitude is based, at least in part, on the increase in the height.

20. The system of claim 19, wherein determining the displacement direction further comprises:
   determining an azimuth angle of the sun relative to the wind turbine for the given sun position;
   determining an elevation angle of the sun above a horizon relative to the wind turbine for the given sun position;
   receiving an indication of a thermal property of a tower material;
   determining an azimuth offset for the thermal gradient based, at least in part, on the elevation angle, wherein the azimuth offset corresponds to an angular difference between the azimuth angle of the sun and an azimuth angle of the location of the maximal peak of the thermal gradient on the tower; and
   locating a circumferential position of the maximal peak of the thermal gradient based on the azimuth offset.

\* \* \* \* \*